(12) United States Patent
Kim

(10) Patent No.: US 8,630,681 B2
(45) Date of Patent: Jan. 14, 2014

(54) MOBILE TERMINAL AND METHOD FOR CONTROLLING FUNCTIONS RELATED TO EXTERNAL DEVICES

(75) Inventor: Jong Hwan Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 502 days.

(21) Appl. No.: 12/509,386

(22) Filed: Jul. 24, 2009

(65) Prior Publication Data

US 2010/0099456 A1 Apr. 22, 2010

(30) Foreign Application Priority Data

Oct. 20, 2008 (KR) .................. 10-2008-0102525

(51) Int. Cl.
- *H04M 1/00* (2006.01)
- *H04B 7/00* (2006.01)
- *H04B 1/38* (2006.01)

(52) U.S. Cl.
USPC .................. 455/556.1; 455/41.2; 455/566

(58) Field of Classification Search
None
See application file for complete search history.

(56) References Cited

U.S. PATENT DOCUMENTS

| | | | | |
|---|---|---|---|---|
| 6,489,934 | B1 * | 12/2002 | Klausner ...................... | 345/1.1 |
| 6,764,185 | B1 * | 7/2004 | Beardsley et al. ............ | 353/122 |
| 7,061,477 | B1 * | 6/2006 | Noguchi ...................... | 345/204 |
| 2002/0108108 | A1 * | 8/2002 | Akaiwa et al. ................ | 725/30 |
| 2005/0186988 | A1 * | 8/2005 | Lim et al. ...................... | 455/557 |
| 2006/0079214 | A1 * | 4/2006 | Mertama et al. ............ | 455/414.1 |
| 2006/0221063 | A1 * | 10/2006 | Ishihara ...................... | 345/173 |
| 2008/0039063 | A1 * | 2/2008 | Ichieda ...................... | 455/420 |

FOREIGN PATENT DOCUMENTS

| | | |
|---|---|---|
| CN | 1484136 | 3/2004 |
| CN | 101102129 | 1/2008 |
| WO | 2004023766 | 3/2004 |
| WO | 2008011361 | 1/2008 |

* cited by examiner

*Primary Examiner* — Yuwen Pan
*Assistant Examiner* — Ayodeji Ayotunde
(74) *Attorney, Agent, or Firm* — Lee, Hong, Degerman, Kang & Waimey

(57) ABSTRACT

A mobile terminal and controlling method thereof are disclosed, by which data can be conveniently shared between a terminal having a projector and an external device connected to the terminal. A mobile terminal includes a projector module configured to project an image onto an external surface, a wireless communication unit configured to establish a wireless connection for communicating with an external device, and a controller configured to display an icon in the projected image corresponding to the connected external device, receive an input selecting the displayed icon, execute a function related to the external device in response to the input, and direct a movement of an object displayed in the projected image according to a signal received from the connected external device.

28 Claims, 30 Drawing Sheets

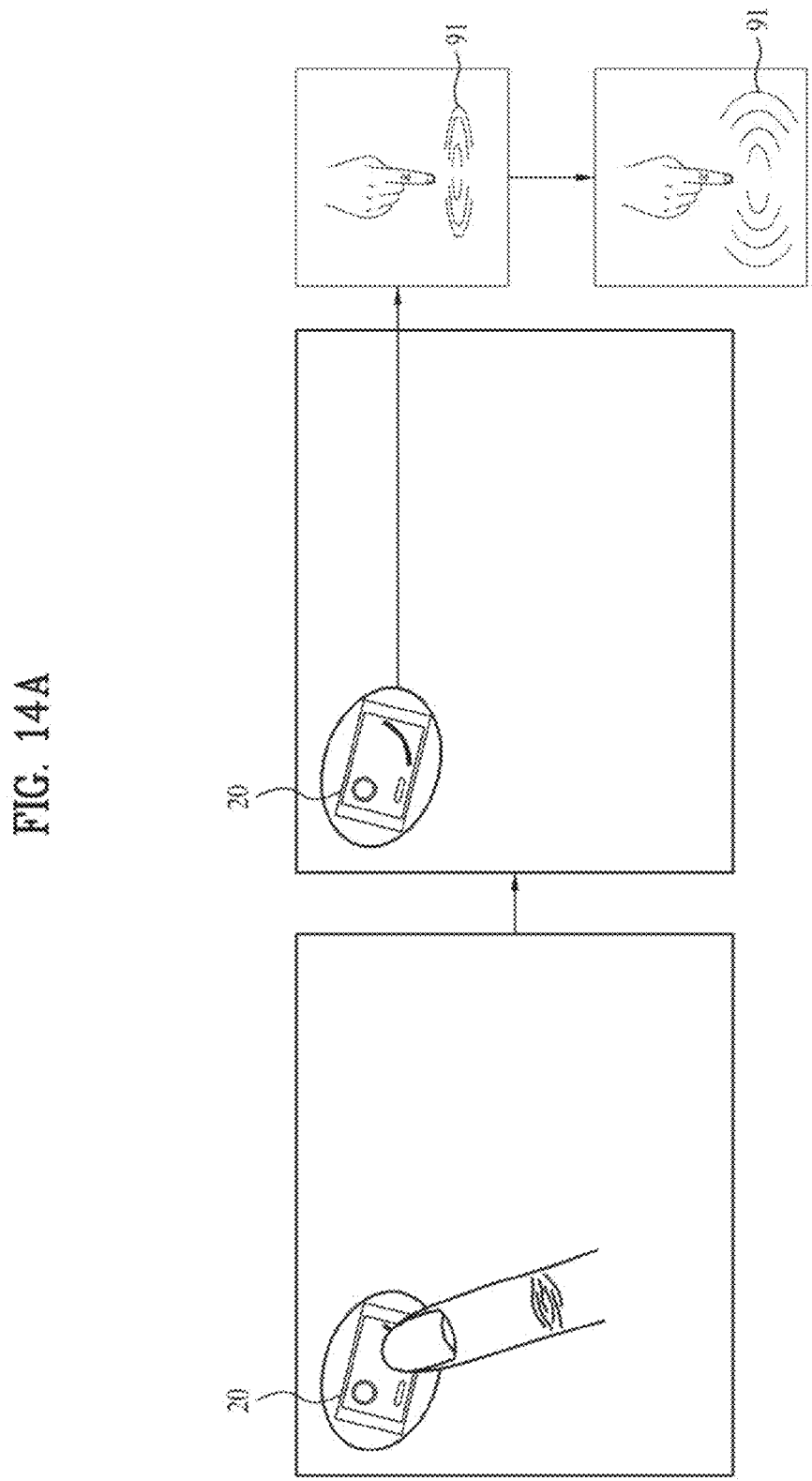

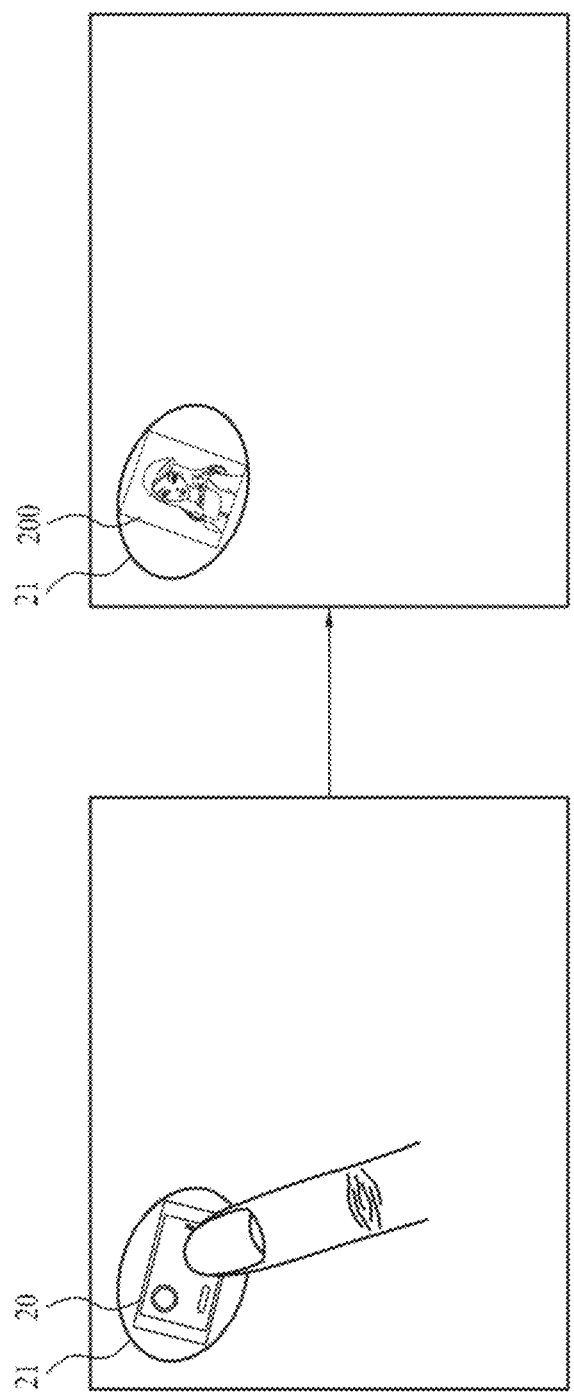

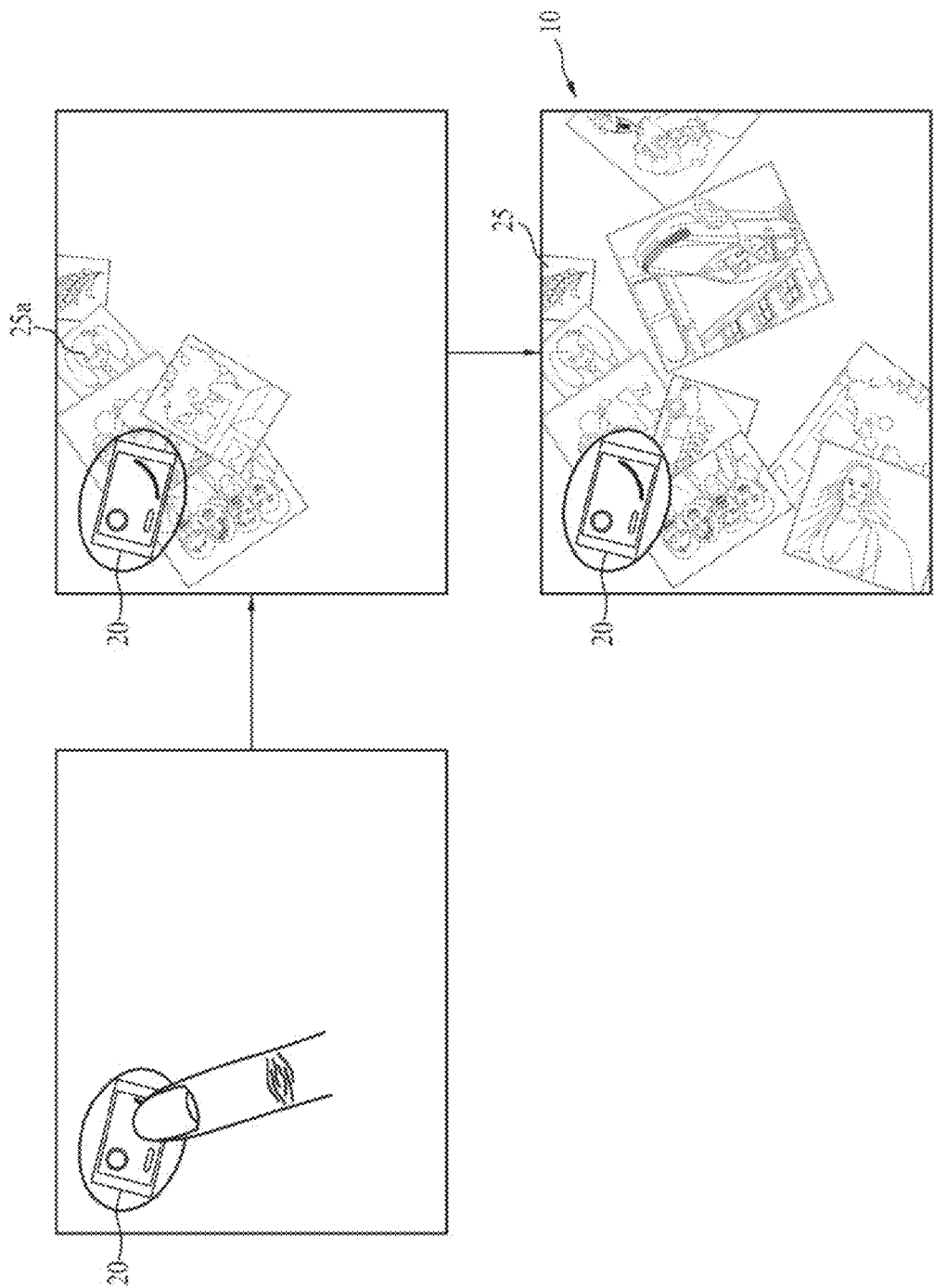

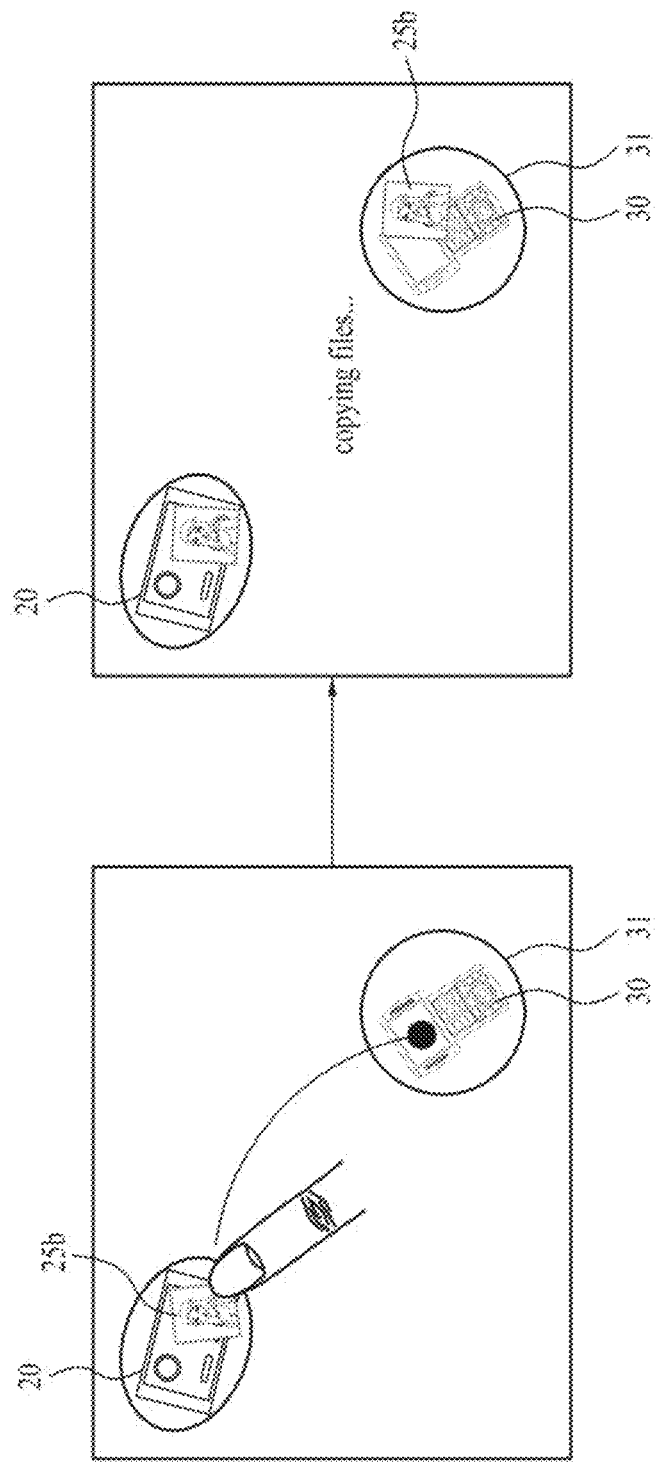

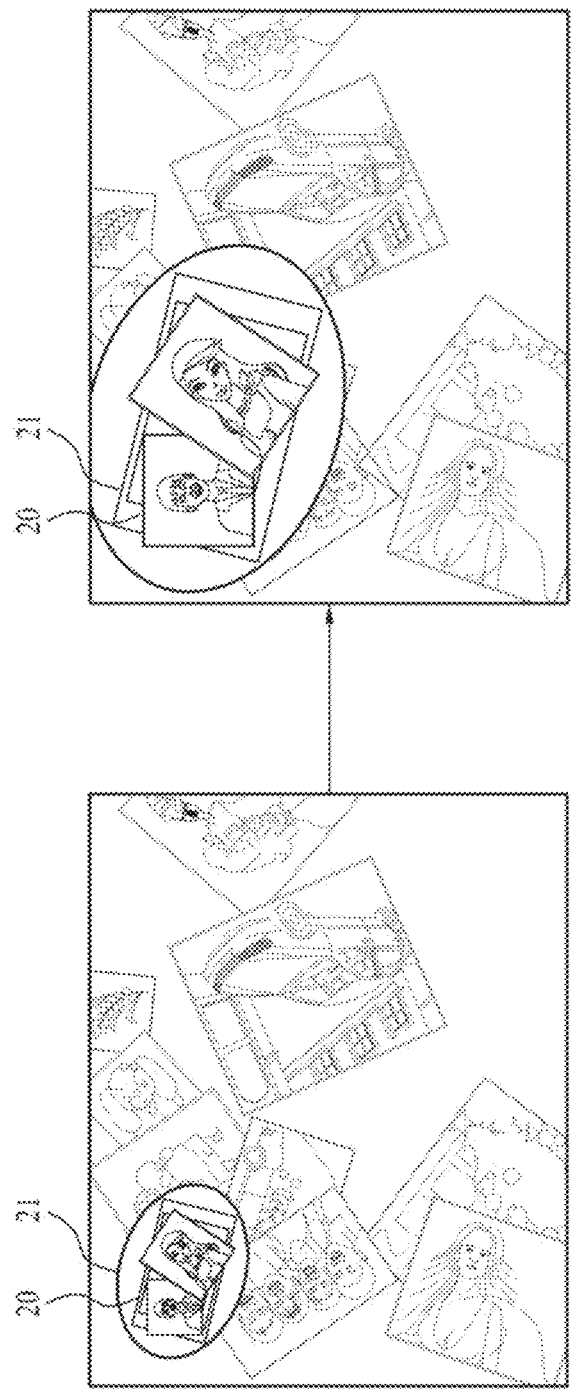

MOBILE TERMINAL AND METHOD FOR CONTROLLING FUNCTIONS RELATED TO EXTERNAL DEVICES

CROSS-REFERENCE TO RELATED APPLICATIONS

Pursuant to 35 U.S.C. §119(a), this application claims the benefit of earlier filing date and right of priority to Korean Application No. 10-2008-0102525, filed on Oct. 20, 2008, the contents of which are hereby incorporated by reference herein in its entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for controlling a mobile terminal provided with a projector module.

2. Discussion of the Related Art

The marketplace demand for mobile terminals with increasing functionality and a wider diversity of capabilities has continued to escalate in recent years. A mobile terminal is a device such as a mobile telephone or a personal digital assistant which may be configured to perform a wide variety of functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to the presence or absence of mobility. The mobile terminals can be further classified into handheld terminals and vehicle mount terminals according to their availability to be hand-carried.

Efforts are ongoing to provide support for mobile terminals to include an ever increasing number of functions, applications and features. These efforts include software and hardware improvements, as well as changes and improvements in the structural components which form the mobile terminal.

In light of the increasing number of mobile terminals that have included multimedia functions as well as wireless communication functions, an attendant demand has arisen for a technique of sharing data more conveniently and efficiently using a terminal having a capability to connect with external devices.

SUMMARY OF THE INVENTION

Accordingly, the present invention is directed to a mobile terminal and controlling method thereof that substantially obviate one or more problems due to limitations and disadvantages of the related art.

In one aspect, a mobile terminal may include a projector module configured to project an image onto an external surface, a wireless communication unit configured to establish a wireless connection for communicating with an external device, and a controller configured to display an icon in the projected image corresponding to the connected external device, receive an input selecting the displayed icon, execute a function related to the external device in response to the input, and direct a movement of an object displayed in the projected image according to a signal received from the connected external device.

In another aspect, a mobile terminal may include a projector module configured to project an image onto an external surface, an input unit configured to receive user input, a wireless communication unit configured to establish a wireless connection for communicating with an external device, and a controller configured to execute a function related to the external device in response to an input, direct a movement of a first cursor displayed in the projected image according to a signal received from the input unit, and direct a movement of a second cursor displayed in the projected image according to a signal received from the connected external device.

In still another aspect, a method of controlling a mobile terminal configured with a projector module may include projecting an image onto an external surface using the projector module, including establishing a wireless connection for communicating with an external device, displaying an icon in the projected image corresponding to the connected external device, receiving an input selecting the displayed icon, executing a function related to the external device in response to the input, and directing a movement of an object displayed in the projected image according to a signal received from the connected external device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 14A to 14D are diagrams for a type change of an icon indicating a selection of an external device in a mobile terminal according to an embodiment of the present invention;

FIGS. 15A and 15B are diagrams for a method of displaying an object of a photo album;

FIGS. 16A to 16C are diagrams for controlling a displayed object;

FIGS. 17A to 17C are diagrams of a type for executing a function related to a selected external device;

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
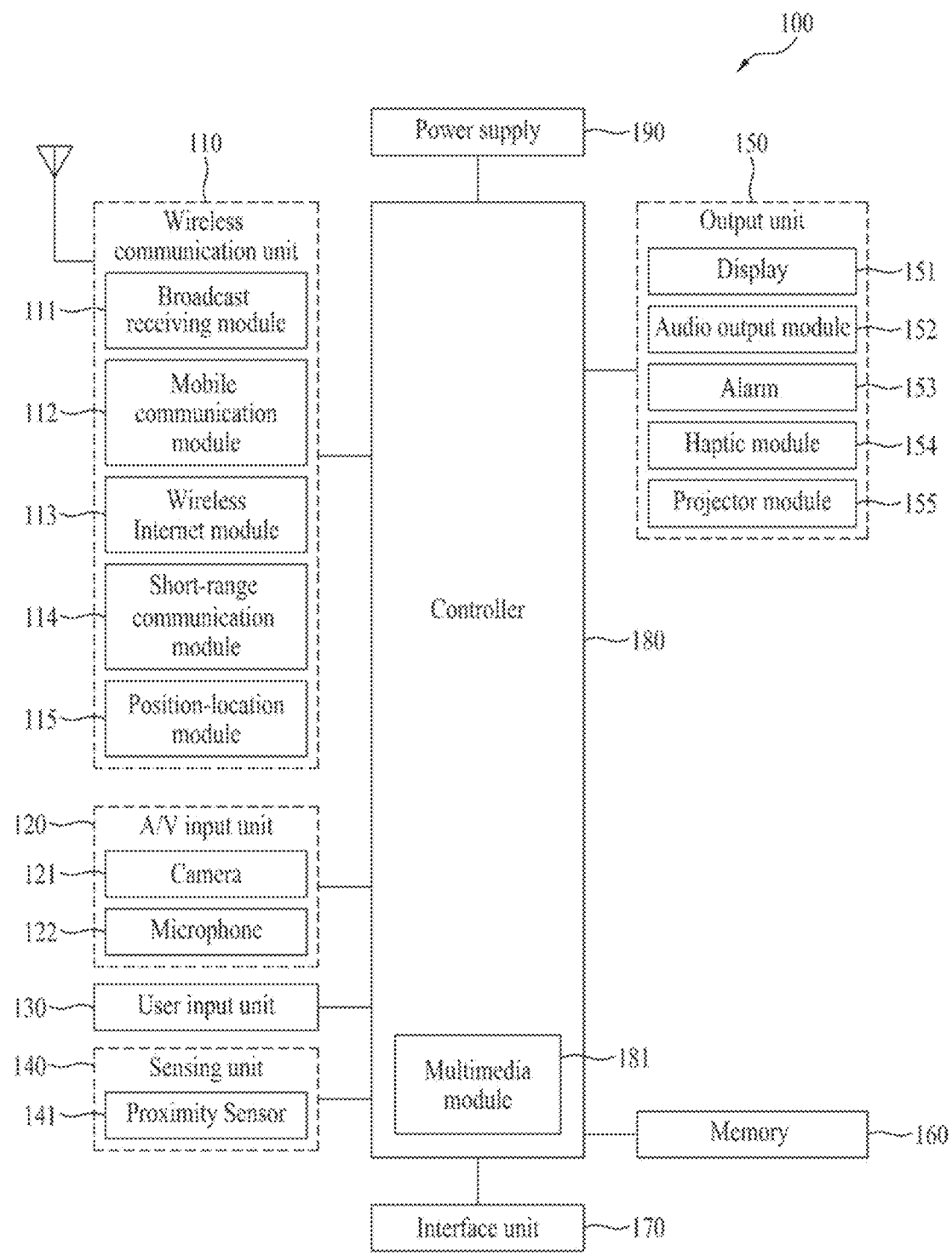
FIG. 1 is a block diagram of a mobile terminal according to one embodiment of the present invention.

FIG. 1 is a block diagram of a mobile terminal 100 in accordance with an embodiment of the present invention. The mobile terminal of FIG. 1 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may additionally or alternatively be implemented.

In the following description, the above elements of the mobile terminal 100 are explained in sequence.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia transmissions, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
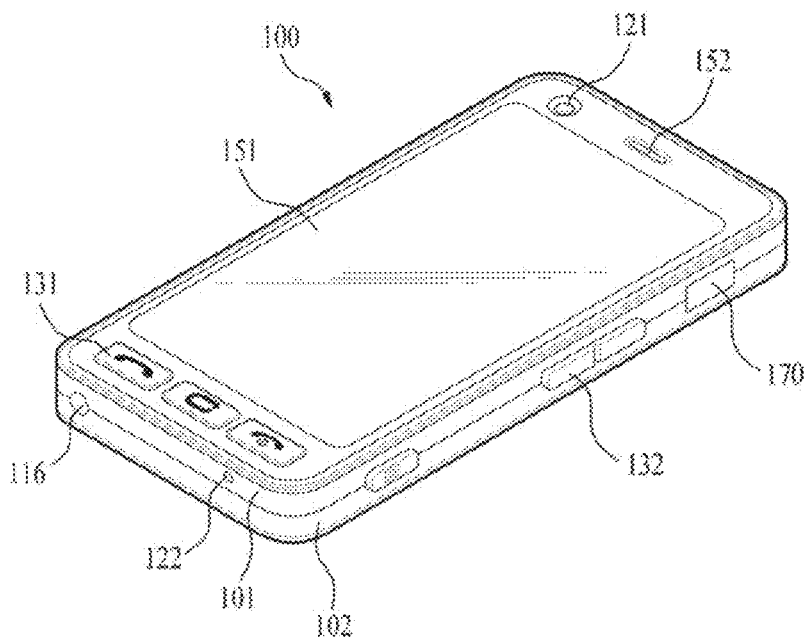
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like, for example.

A display 151, an audio output unit 152, a camera 121, user input units 131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
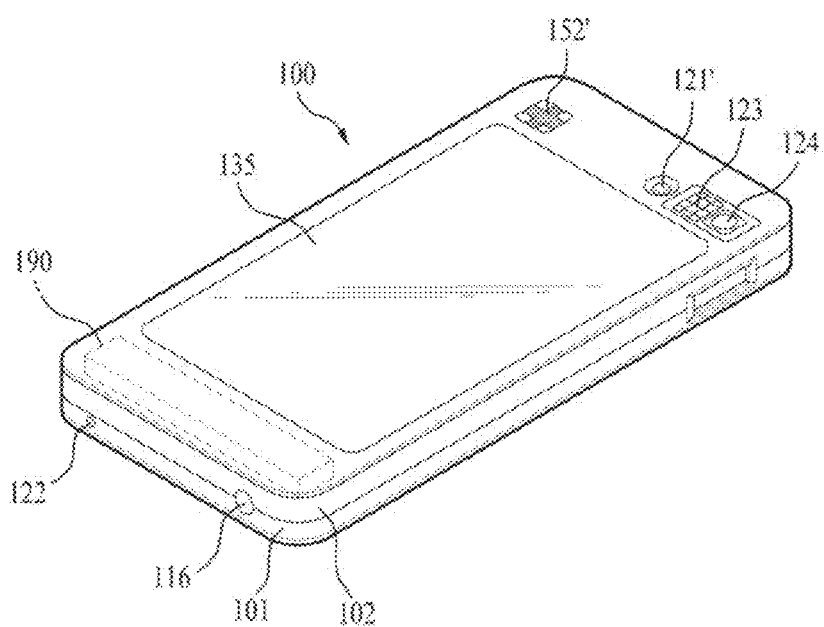
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Interconnected operational mechanism between the display 151 and the touchpad 135 are explained with reference to FIG. 3A and FIG. 3B as follows.

Figure 3A:
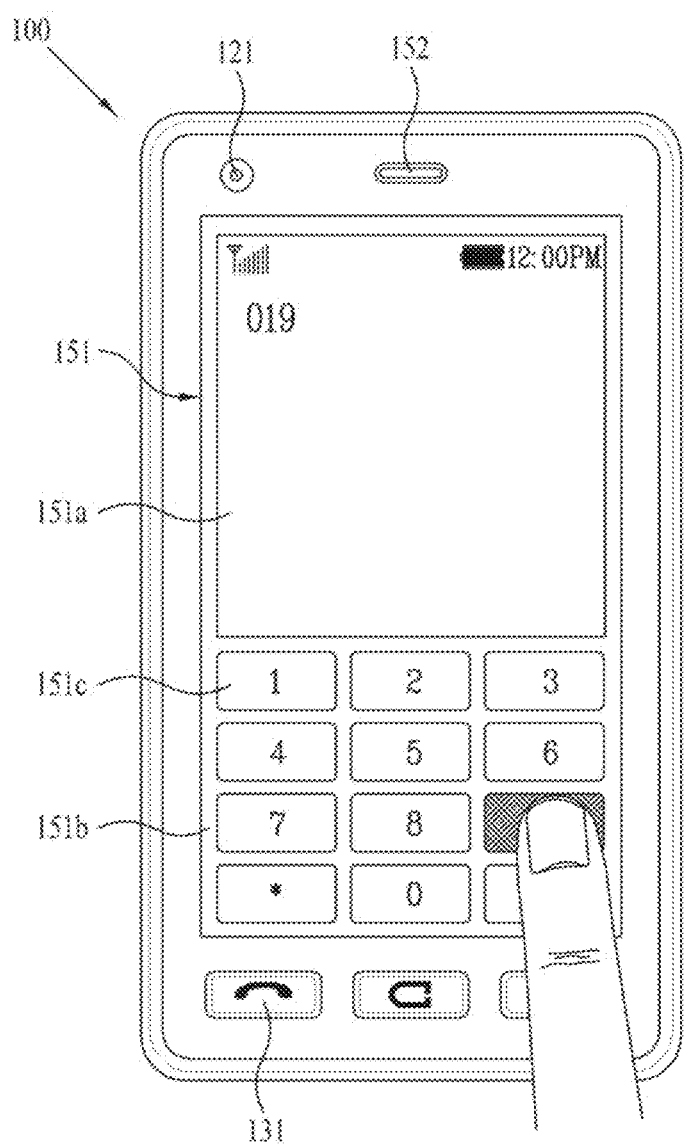
FIG. 3A and FIG. 3B are front diagrams of a mobile terminal according to one embodiment of the present invention for explaining one operational status of the mobile terminal, respectively.
Figure 3B:
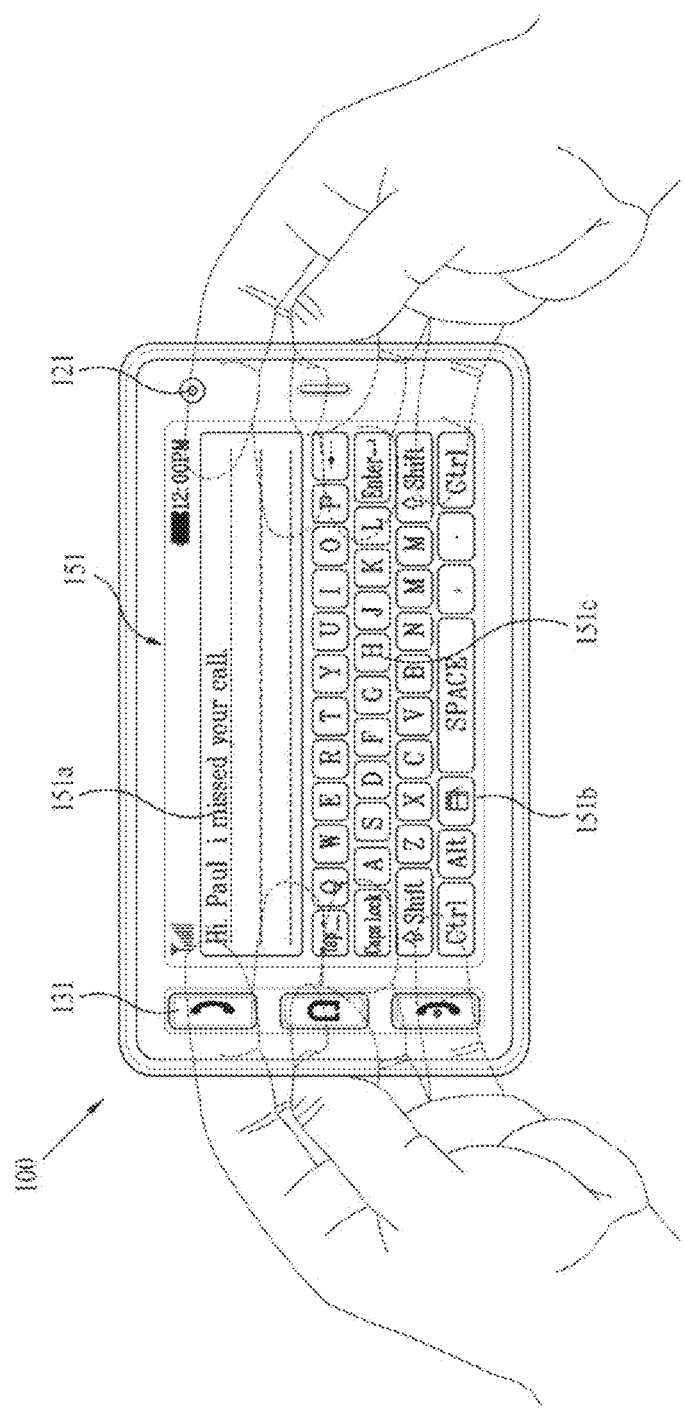

FIG. 3A and FIG. 3B are front-view diagrams of a terminal according to one embodiment of the present invention for explaining an operational state thereof.

Various kinds of visual information can be displayed on the display 151. This information can be displayed in the form of characters, numerals, symbols, graphics, icons and the like.

In order to input the information, at least one of the characters, numerals, symbols, graphics and icons are represented as a single predetermined array to be implemented in a keypad formation. This keypad formation can include so-called 'soft keys'.

FIG. 3A shows that a touch applied to a soft key is inputted through a front face of a terminal body.

The display 151 is operable through an entire area or by being divided into a plurality of regions. In the latter case, a plurality of the regions can be configured to be interoperable.

For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a. If the user input unit 131 is manipulated, a call connection for the phone number displayed on the output window 151a is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). Additionally, the display 151 can be configured to change an output picture according to the arranged direction of the terminal body.

FIG. 3B shows that a text input mode is activated in the terminal.

An output window 151a and an input window 151b are displayed on the display 151. A plurality of soft keys 151c representing at least one of characters, symbols and digits can be arranged in the input window 151b. The soft keys 151c can be arranged in the QWERTY key formation.

If the soft keys 151c are touched through the touchpad (i.e., 135 in FIG. 2B), the characters, symbols and digits corresponding to the touched soft keys are outputted to the output window 151a. Thus, the touch input via the touchpad 135 is advantageous in that the soft keys 151c can be prevented from being blocked by a finger in case of touch, which is compared to the touch input via the display 151. In case that the display 151 and the touchpad 135 are configured to be transparent, it is possible for a user to visually check fingers located at the backside of the terminal body. Hence, more accurate touch inputs are possible.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

The proximity sensor 141 described with reference to FIG. 1 is explained in detail with reference to FIG. 4 as follows.

Figure 4:
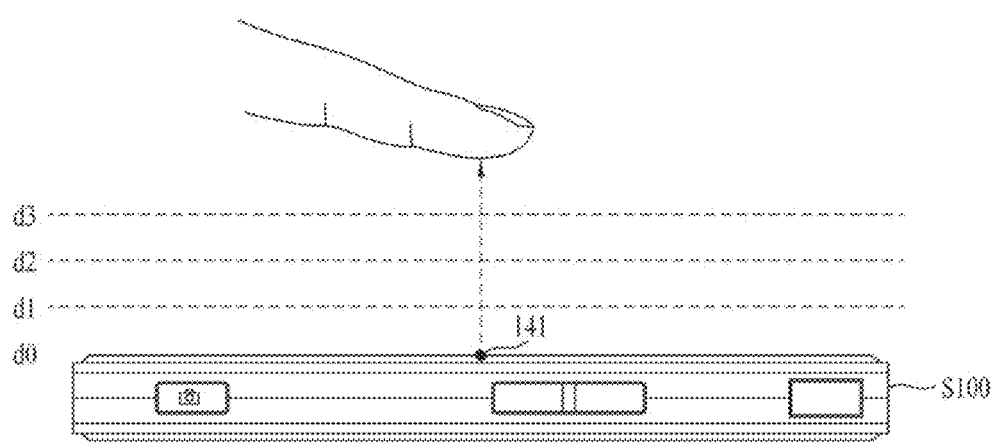
FIG. 4 is a side diagram of a mobile terminal to explain the concept of proximity depth of a proximity sensor.

FIG. 4 is a conceptual diagram for explaining a proximity depth of a proximity sensor.

Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth').

In FIG. 4, exemplarily shown is a cross-section of the touchscreen provided with a proximity sensor capable of three proximity depths. It is understood that a proximity sensor capable of proximity depths amounting to a number smaller than 3, or equal to or greater than 4 is also possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Figure 5:
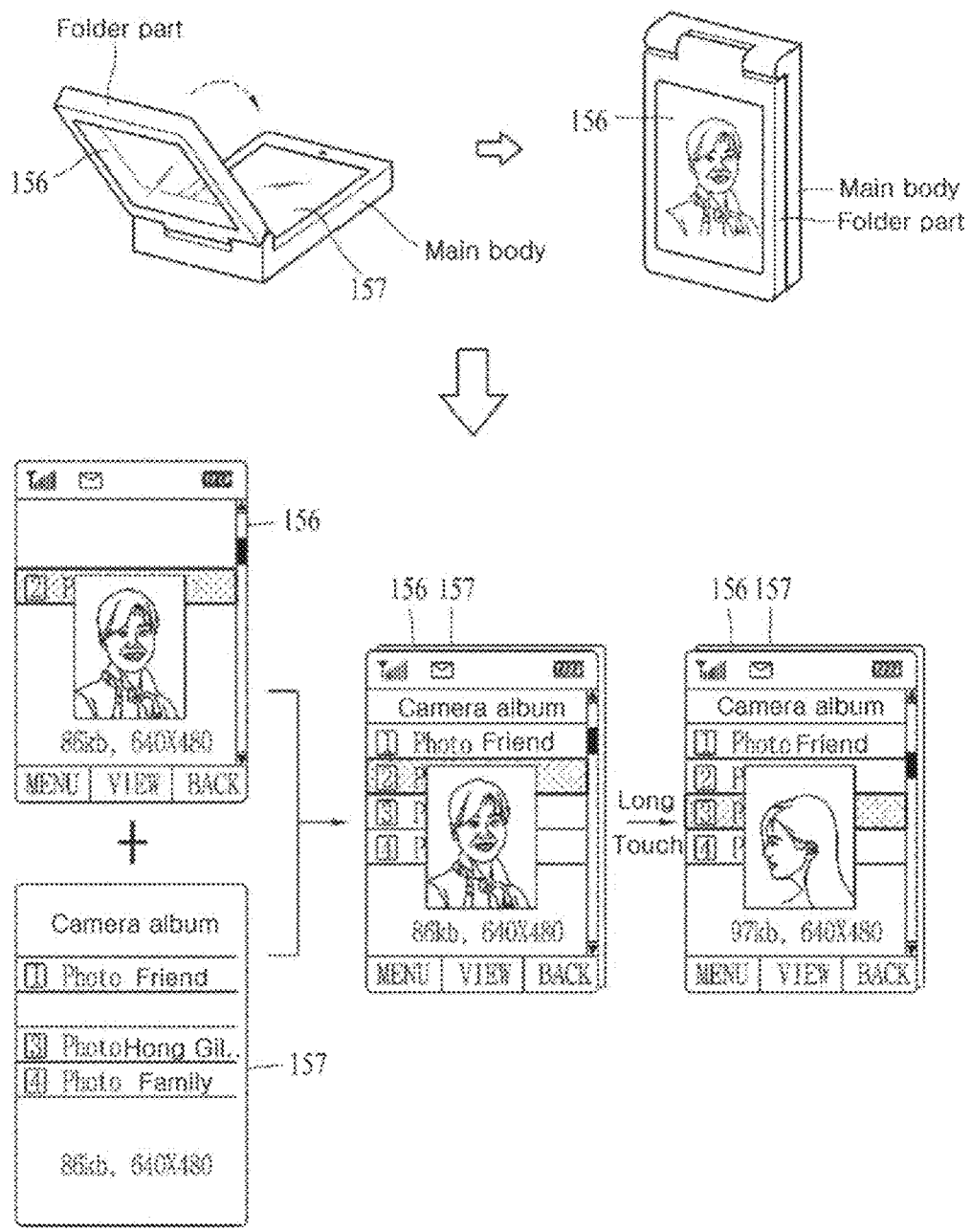
FIG. 5 is a flow diagram to explain the concept of a method of controlling a touch action on a pair of displays overlapped with each other.

FIG. 5 is a conceptual diagram of an exemplary method for controlling a touch action in a state that a pair of displays 156 and 157 is overlapped with each other.

Referring to FIG. 5, a terminal shown in the drawing is a folder type terminal in which a folder part is connected to a main body in a manner of being folded or unfolded.

A first display 156 provided to the folder part is a light-transmittive or transparent type such as TOLED, while a second display 157 provided to the main body may be a non-transmittive type such as LCD. Each of the first and second displays 156 and 157 can include a touch-inputtable touchscreen.

For instance, if a touch (contact touch or proximity touch) to the first display or TOLED 156 is detected, the controller 180 selects or runs at least one image from an image list displayed on the TOLED 156 according to a touch type and a touch duration.

In the following description, a method of controlling information displayed on a different display or an LCD 157 in case of an touch to the TOLED 156 externally exposed in an overlapped configuration is explained, in which the description is made with reference to input types classified into a touch, a long touch, a long-touch & drag and the like.

In the overlapped state (a state that mobile terminal is closed or folded), the TOLED 156 is configured to be overlapped with the LCD 157. In this state, if a touch different from a touch for controlling an image displayed on the TOLED 155, e.g., a long touch (e.g., a touch having a duration of at least 2 seconds) is detected, the controller 180 enables at least one image to be selected from an image list displayed on the LCD 157 according to the touched input. The result from running the selected image is displayed on the TOLED 156.

The long touch is usable in selectively shifting a specific one of entities displayed on the LCD 157 to the TOLED 156 (without an action for running the corresponding entity). In particular, if a user performs a long touch on a prescribed region of the TOLED 156 corresponding to a specific entity of the LCD 157, the controller 180 controls the corresponding entity to be displayed by being shifted to the TOLED 156.

Meanwhile, an entity displayed on the TOLED 156 can be displayed by being shifted to the LCD 157 according to such a prescribed touch input to the TOLED 156 as flicking, swirling and the like. In the drawing, exemplarily shown is that a second menu displayed on the LCD 157 is displayed by being shifted to the TOLED 156.

In case that another input, e.g., a drag is additionally detected together with a long touch, the controller 180 executes a function associated with an image selected by the long touch so that a preview picture for the image can be displayed on the TOLED 156 for example. In the drawing, exemplarily shown is that a preview (picture of a male) for a second menu (image file) is performed.

While the preview image is outputted, if a drag toward a different image is additionally performed on the TOLED 156 by maintaining the long touch, the controller 180 shifts a selection cursor (or a selection bar) of the LCD 157 and then displays the image selected by the selection cursor on the preview picture (picture of female). Thereafter, after completion of the touch (long touch and drag), the controller 180 displays the initial image selected by the long touch.

The touch action (long touch and drag) is identically applied to a case that a slide (action of a proximity touch corresponding to the drag) is detected to together with a long proximity touch (e.g., a proximity touch maintained for at least 2 or 3 seconds) to the TOLED 156.

In case that a touch action differing from the above-mentioned touch actions is detected, the controller 180 is able to operate in the same manner of the general touch controlling method.

The method of controlling the touch action in the overlapped state is applicable to a terminal having a single display. And, the method of controlling the touch action in the overlapped state is applicable to terminals differing from the folder type terminal having a dual display as well.

Figure 6A:
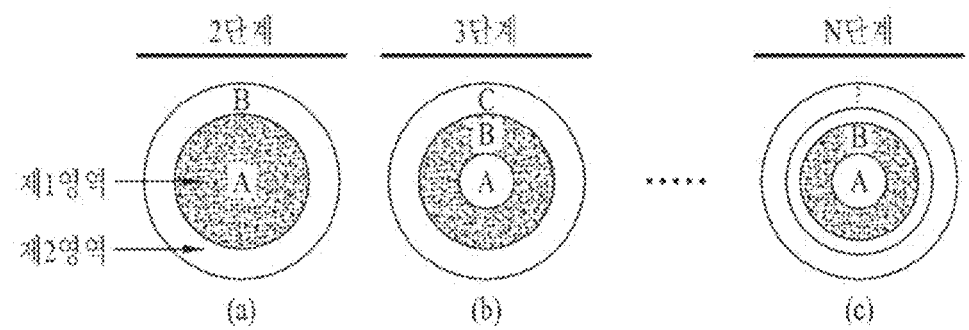
FIG. 6A and FIG. 6B are diagrams to explain the concepts of a proximity touch recognizing area for detecting a proximity signal and a haptic area for generating a tactile effect, respectively.
Figure 6B:
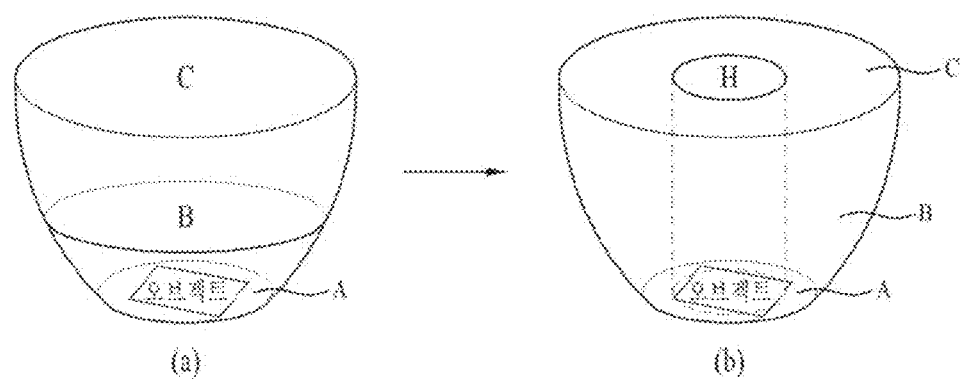

FIG. 6A and FIG. 6B are diagrams for the description of a proximity touch recognition area and a tactile effect generation region.

FIG. 6A represents such an object as an icon, a menu item and the like in a circle type for clarity and convenience of explanation.

A region for displaying an object on the display 151, as shown in (a) of FIG. 6A, can be divided into a first region A at a central part and a second region B enclosing the first region A. The first and second regions A and B can be configured to generate tactile effects differing from each other in strength or pattern. For instance, the first and second regions can be configured to generate 2-step vibrations in a manner of outputting a first vibration if the second region B is touched or outputting a second vibration greater than the first vibration if the first region A is touched.

In case that both of the proximity touch recognition region and the haptic region are simultaneously set in the region having the object displayed therein, the haptic region for generating the tactile effect may be set to be different from the proximity touch recognition region for detecting the proximity signal. In particular, the haptic region may be set narrower or wider than the proximity touch recognition region. For instance, in (a) of FIG. 6A, the proximity touch recognition region may be set to the area including both of the first and second regions A and B. And, the haptic region may be set to the first region A.

The region having the object displayed therein may be discriminated into three regions A, B and C as shown in (b) of FIG. 6A. Alternatively, the region having the object displayed therein may be discriminated into N regions (N>4) as shown in (c) of FIG. 6A. And, each of the divided regions may be configured to generate a tactile effect having a different strength or pattern. In case that a region having a single object represented therein is divided into at least three regions, haptic region and the proximity touch recognition region may be set to differ from each other according to a use environment.

A size of the proximity touch recognition region of the display 151 may be configured to vary according to a proximity depth. In particular, referring to (a) of FIG. 6B, the proximity touch recognition region is configured to decrease by C→B→A according to the proximity depth for the display 151. On the contrary, the proximity touch recognition region is configured to increase by C→B→A according to the proximity depth for the display 151. Despite the above configuration, the haptic region may be set to have a predetermined size, as the region 'H' shown in (b) of FIG. 6B, regardless of the proximity depth for the display 151.

In case of dividing the object-displayed region for the setting of the haptic region or the proximity touch recognition region, one of various schemes of horizontal/vertical division, radial division and combinations thereof may be used as well as the concentric circle type division shown in FIG. 6A.

In the following description, the configuration of the above-described projector module provided to the bar type mobile terminal 100 is explained in detail with reference to FIG. 7A and FIG. 7B.

Figure 7A:
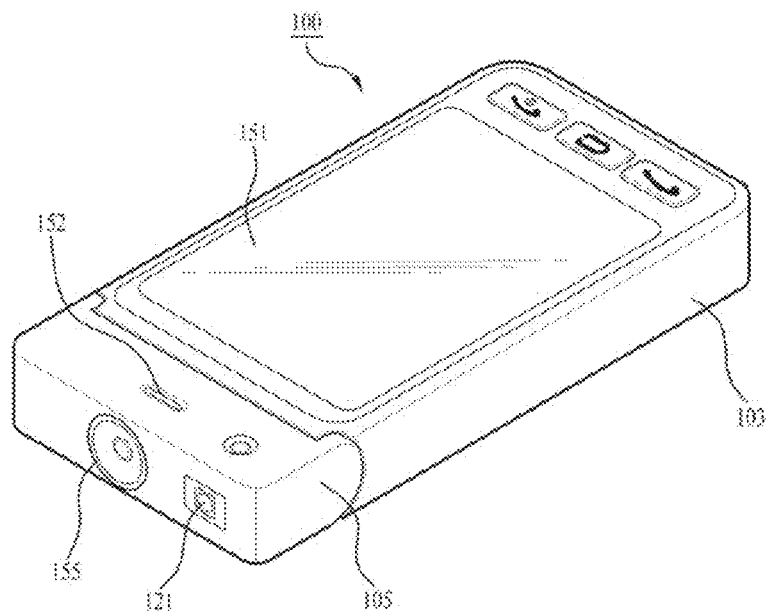
FIG. 7A and FIG. 7B are perspective diagrams of a mobile terminal according to an embodiment of the present invention.
Figure 7B:
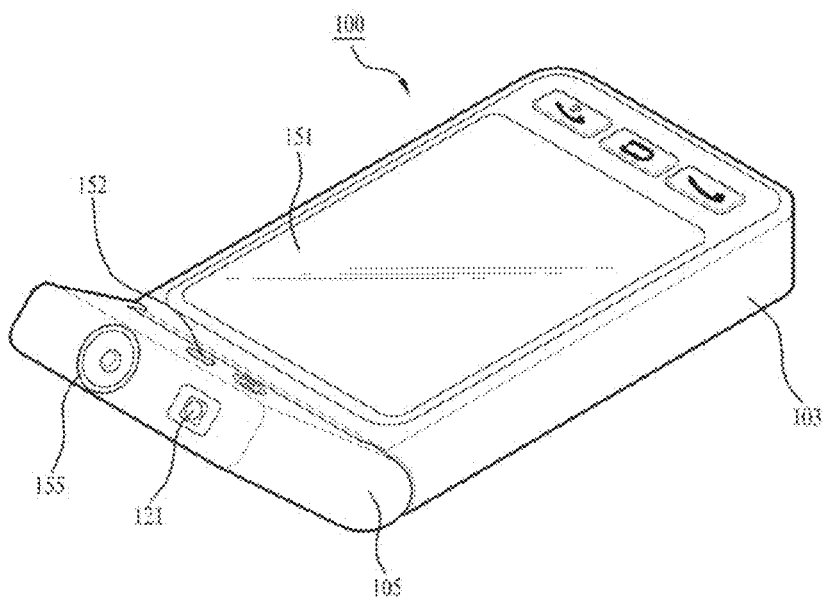

FIG. 7A and FIG. 7B are perspective diagrams of a mobile terminal according to one embodiment of the present invention.

Referring to FIG. 7A, a projector body 105 having a projector module 155 can be rotatably coupled to a main body 101 of the mobile terminal.

In particular, the projector body 105 can be hinged to the main body 103. A projected angle of an image, which is projected using the projector module 155 provided to the projector body 105, can be controlled. And, a camera 121 can be provided to the projector body 105 to photograph the image projected by the projector module 155.

FIG. 7A shows a status before the projector body 105 rotatably coupled to the main body 103 is rotated, and FIG. 7B shows a status after the projector body 105 has been rotated.

In the following description, embodiments of a control method implemented in the above-configured mobile terminal are explained with reference to the accompanying drawings.

The following embodiments can be more easily implemented if the display module 151 includes a touchscreen. In the following description, a screen display seen on the touchscreen 151 is referred to as 'first display' and a projection display projected by the projector module 155 is referred to as 'second display'.

Meanwhile, a pointer generally refers to a means (e.g., a stylus pen, a finger, etc.) for touching the touchscreen, as well as an indicator having a specific shape (e.g., an arrow, a sandglass, etc.) displayed on a display to move according to a manipulation of a mouse, touchpad or the like.

In this disclosure, to distinguish the two meanings of the pointer from each other, a means for touching a touchscreen is named 'pointer' and an indicator having a specific shape, which moves according to a manipulation of a mouse, touchpad or the like, is named 'cursor'. The cursor can include an indication on a display to indicate a position where a user can input a text.

In an embodiment, while a prescribed image is projected on an external screen via the projector module 155, pointer may be used to point to a specific position on the external screen. In this case, a shadow of the pointer naturally appears on the screen according to the light projected from the projector module 155. If so, an image including the shape and shadow of the pointer is recognizable through the camera module 121 for photographing the same direction of an image projection of the projector module 155. Through the photograph(s) (or, alternatively, a video in the case of a video camera), a distance may then be obtained between the pointer and the shadow from the image recognized through the camera module 121. According to an extent of the obtained distance, it is recognized whether a point pointed to by the pointer in the displayed image is touched. An operation corresponding to the recognized touched point may then be performed. Therefore, in this disclosure, the input via the user input unit 130 can be performed as mentioned above using a pointer on the second display in conjunction with the camera module 121.

A mobile terminal according to an aspect of the present invention is connectible to at least one external device by searching for external devices by hardwire or wirelessly through a prescribed network. The connected external device can be displayed as at least one prescribed icon on at least one of the first and second displays. If the at least one prescribed icon representing the connected at least one external device is selected via the user input unit of the terminal or the connected external device, a prescribed function related to the connected external device can be run in a prescribed manner on at least one of the first and second displays. This is schematically explained with reference to FIG. 8 as follows.

Figure 8:
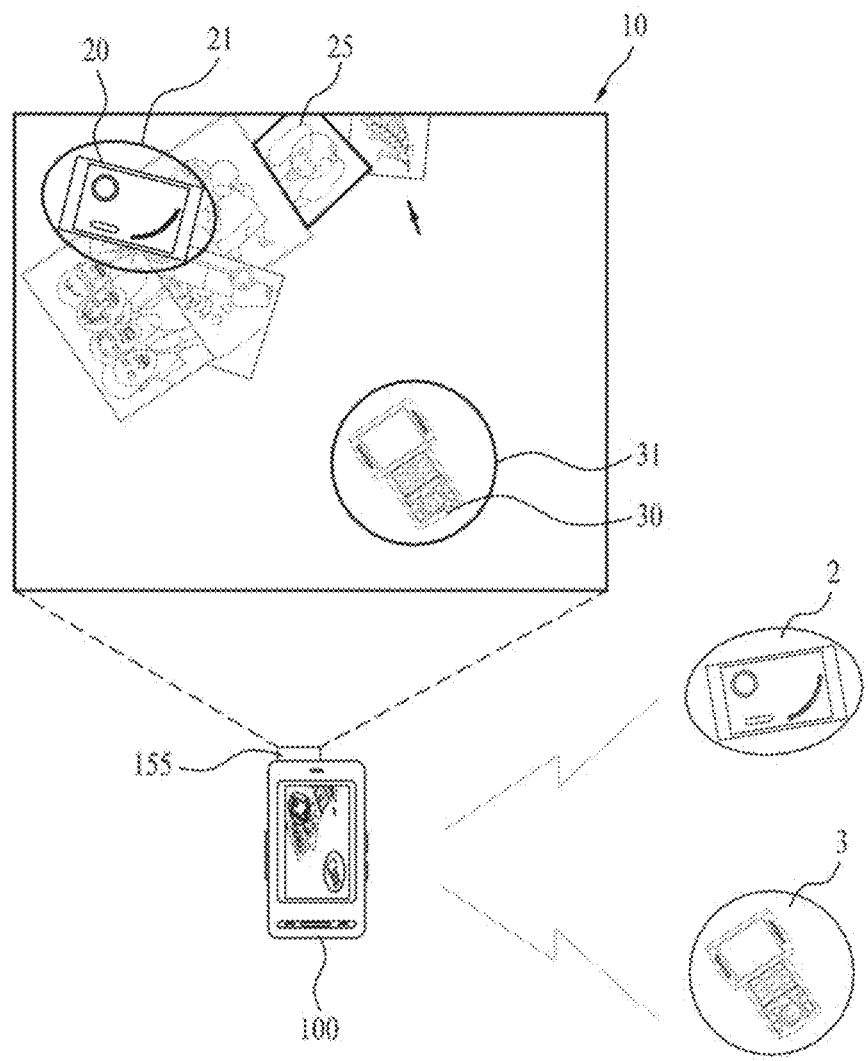
FIG. 8 is a conceptual diagram for a terminal according to an embodiment of the present invention.

FIG. 8 is a conceptual diagram for a terminal according to one embodiment of the present invention.

Referring to FIG. 8, a terminal 100 having a projector module 155 searches for external devices, e.g., a digital camera 2 and an external mobile terminal 3, via the wireless communication unit 110 (FIG. 1) and is then connected to the searched external devices. The terminal 100 may project a second display, which shows functions related to the external devices, on a projection plane 10 via the projector module 155.

On the second display, the external digital camera 2 is represented as a camera icon 20 in a first prescribed area 21, and the corresponding related function is executed in the terminal 100 to display photos 25 loaded in the digital camera 2. In an aspect, the function is executed in response to the icon 20 being selected via a user input unit of the terminal or the connected external device. In the following description, assume that an image projected on the projection plane 10 is identically displayable on the display 151 of the terminal 100, although this need not be the case. And, the external mobile terminal 3 is represented as a terminal icon 30 in a second prescribed area 31.

In the following description, a terminal, which is capable of implementing a prescribed related function during a connection to the aforesaid external device, is explained in detail with reference to: i) a prescribed icon represented during the connection to the external device; ii) a control authority and cursor for selecting the icon and executing a prescribed function related to the connected external device; and iii) a prescribed related function executed when the prescribed icon is selected.

Prescribed Icon Displayed During Connection to External Device.

The terminal 100 having the projector module 155 may display one or more icons during connection to corresponding external devices. The terminal 100 further includes the wireless communication unit 110. In this case, the wireless communication unit 110 is able to exchange data with an external device by such a system including short-range communication and wireless internet as Bluetooth, IdDA (infrared data association), UWB (ultra-wideband), ZigBee, Wi-Fi, Wibro and the like. The external device is connected to the terminal 100 via a prescribed network and is then able to exchange data and controls signals with the terminal 100. Moreover, the external device may include a digital camera, a camcorder and the like as well as the aforesaid mobile terminal The mobile terminal may be connected to the external device via the wireless communication unit and is able to execute an external device connection mode command via a proper menu manipulation in order to perform a function related to the connected external device. The menu manipulation may be performed by a user, or the functions for connecting to the external device may have been pre-programmed, they may be automatic, or they may be performed using another known method. A corresponding prescribed execution picture is displayed on the display 151 to correspond to a first display. And, a second display equal to or partially different from the first display can be projected on an external projection plane via the projector module 155.

If the terminal (100) is prepared to be connected to external devices, at least one external device is connectible via the wireless communication unit 110. The connected at least one external device can be displayed as at least one prescribed icon on at least one of the first display and the second display. The prescribed icon can be represented in various types such as a text, an image and a combination thereof. This is explained with reference to FIG. 9 as follows.

Figure 9:
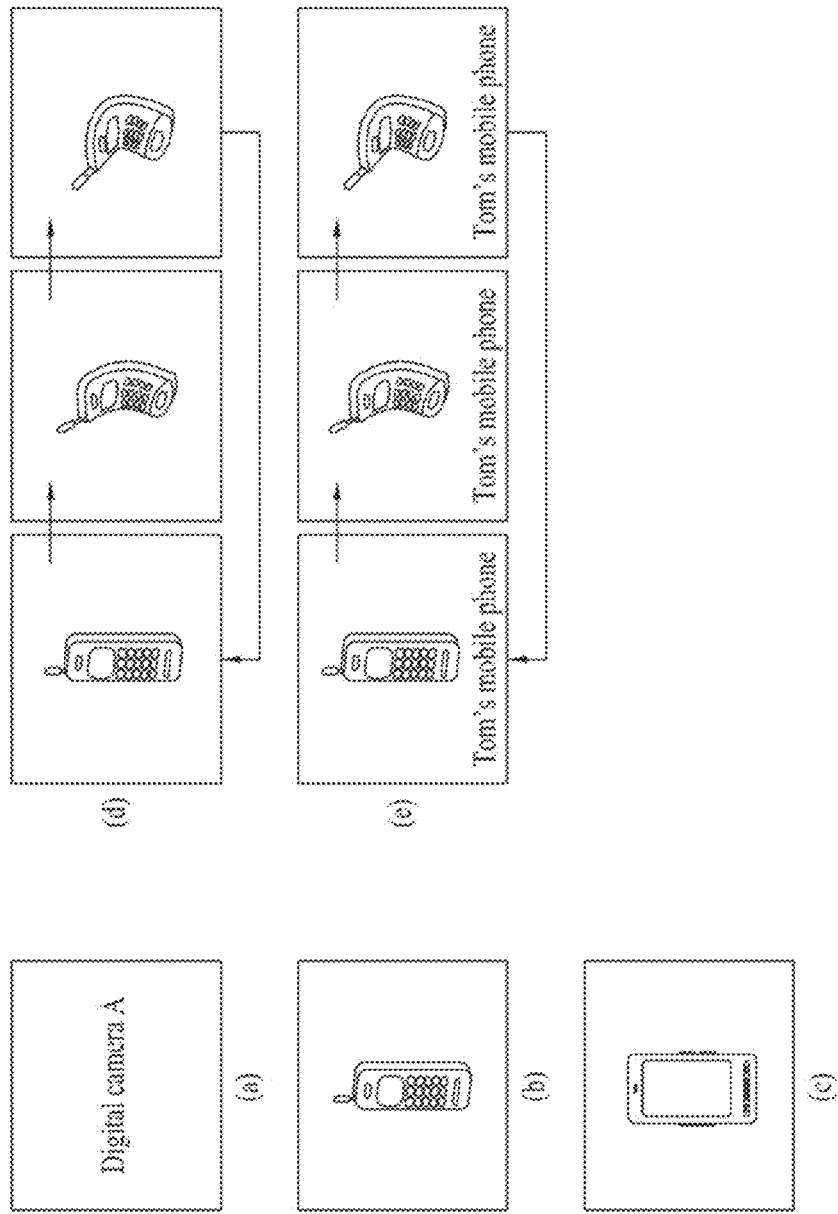
FIG. 9 is an exemplary diagram of icon types for representing connected external devices.

FIG. 9 is an exemplary diagram of icon types for representing connected external devices.

Referring to FIG. 9, an icon may be represented as text [(a) of FIG. 9] or an image for simplifying a connected external device [(b) of FIG. 9]. And, an icon may be represented as a real image of an external device [(c) of FIG. 9] or a moving picture [(d) of FIG. 9]. Further, various of the above-mentioned types may be combined to represent an icon [(e) of FIG. 9].

According to a prescribed reference including a use frequency, a connected sequence, a preset connection priority and the like, effects may be used to visually discriminate the above-mentioned icons. This is explained in detail with reference to FIG. 10 as follows.

Figure 10:
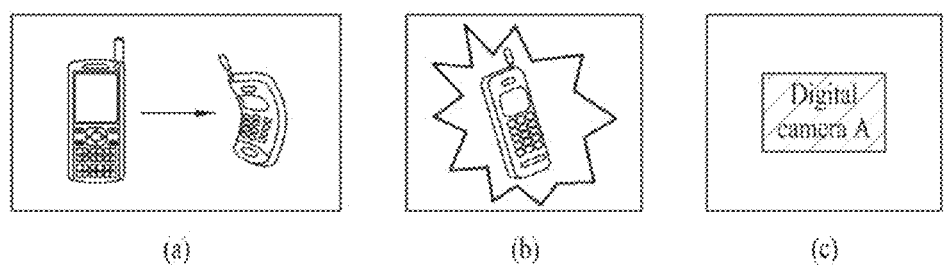
FIG. 10 is a conceptual diagram for a visual effect given to the icon shown in FIG. 9 according to a prescribed reference.

FIG. 10 is a conceptual diagram for a visual effect given to the icon shown in FIG. 9 according to a prescribed reference.

Referring to FIG. 10, a shape of an icon may be changed [(a) of FIG. 10]. An emphasizing image around an image may be added [(b) of FIG. 10]. If an icon includes a text, a pattern or color, which is distinguishable from that of the text, may be added around, behind or over the text.

In case that the terminal 100 is connected to the external device via the short-range communication module 114 by Bluetooth (BT) or the like, an icon representing the external device is displayable in a direction corresponding to a physical location of the external device against the terminal 100.

For instance, assume that a first external device is located a short distance away to the right of the terminal 100. And, assume that the first external device is connected to the terminal 100 by Bluetooth (BT). In this case, an icon representing the first external device can be displayed to the right from a center of at least one of a first display and a second display.

For another instance, assume that a first external device located to the left of the terminal 100 and a second external device located to the right of the terminal 100 are simultaneously connected to the terminal 100 by Bluetooth (BT). In this case, an icon representing the first external device can be displayed to the left from a center of at least one of a first display and a second display and an icon representing the second external device can be displayed to the right from the corresponding center.

The displayed locations of the icons can be displayed in right & left direction, back & forth direction or combined directions thereof, to be discriminated from each other. Moreover, they can be displayed with the above-mentioned visual effect as well.

In addition, the mobile terminal may use information obtained from the communication link with the connected external device along with other sources known in the art to determine the correct physical location of the external device, either relative to the mobile terminal or in general (such as where a GPS device is used to determine location).

If an icon is displayed by the above-described method, an apparatus and method of selecting the icon are needed to perform a prescribed function related to the connected external device. Regarding this, a control authority and cursor are explained as follows.

Control Authority & Cursor for Executing Prescribed Function Related to Connected External Device.

For purposes of this disclosure, a control authority refers to an authority validating control actions for performing a function related to a prescribed external device in connection. For instance, the control authority is capable of allowing selecting a prescribed icon or releasing the icon selection or an operation of selecting/executing/ending a prescribed related function. If a cursor for control is provided, the control authority includes an authority for manipulating the cursor. And, as mentioned in the foregoing description, the cursor means an indication of a specific type which is shifted according to a manipulation of a mouse, touchpad, a touchscreen or the like.

In order to control the selection of the displayed icon and the function related to the connected external device, the control authority may be granted to the connected external device as well as the terminal. This control authority can be granted to the connected external device on the condition of a prescribed input via the user input unit 130 of the terminal 100 or a prescribed input via the external device.

For instance, the control authority may be granted by specifying a connected specific external device by manipulating a control authority relevant menu using an input via the user input unit 130 of the terminal 100. For another instance, if a specific key is inputted via a user input unit of a connected external device or a touch, a long touch, a proximity touch or the like is inputted via a touchscreen, a control authority may be granted to the corresponding external device.

Occasionally, a dedicated (or separate) user input unit for controlling a prescribed related function performed by being connected to the present terminal may not be provided to the connected external device. In this case, the external device can receive a control input in a manner of mapping a control function to a specific key of another user input unit for another function different from the related function.

For instance, assume that the external device is an MP3 player having five buttons for play, stop, record, fast forward and fast rewind. In this case, when the external device is connected to the terminal, four of the five buttons can be mapped to arrow functions (that is, navigation key's functions) for directing for example a cursor up, down, right and left directions, and the remaining button is mapped to a selection function to perform the control function.

In an embodiment, when a control is performed by the terminal 100, if a touchscreen is used as the user input unit 130, power consumption may be reduced by making it possible to detect a touch thereon even though an LCD of the touchscreen is turned off.

In this case, a prescribed cursor according to the control authority is displayed on at least one of the first display and the second display to perform a control function. As the connected external device acquires the control authority by the above-described method, two or more cursors can be simultaneously displayed, one for the terminal and the other(s) for the external device(s). For clarity of the following description, a cursor responding to an input via the user input unit of the terminal is named 'first cursor' and a cursor responding to an input via the connected external device is named 'second cursor'. The first and second cursors are simultaneously displayed on at least one of the first display and the second display to perform the corresponding control functions, respectively. In this case, in order to identify the cursors, different shapes or colors can be given to the cursors, respectively. This is explained with reference to FIG. 11.

Figure 11:
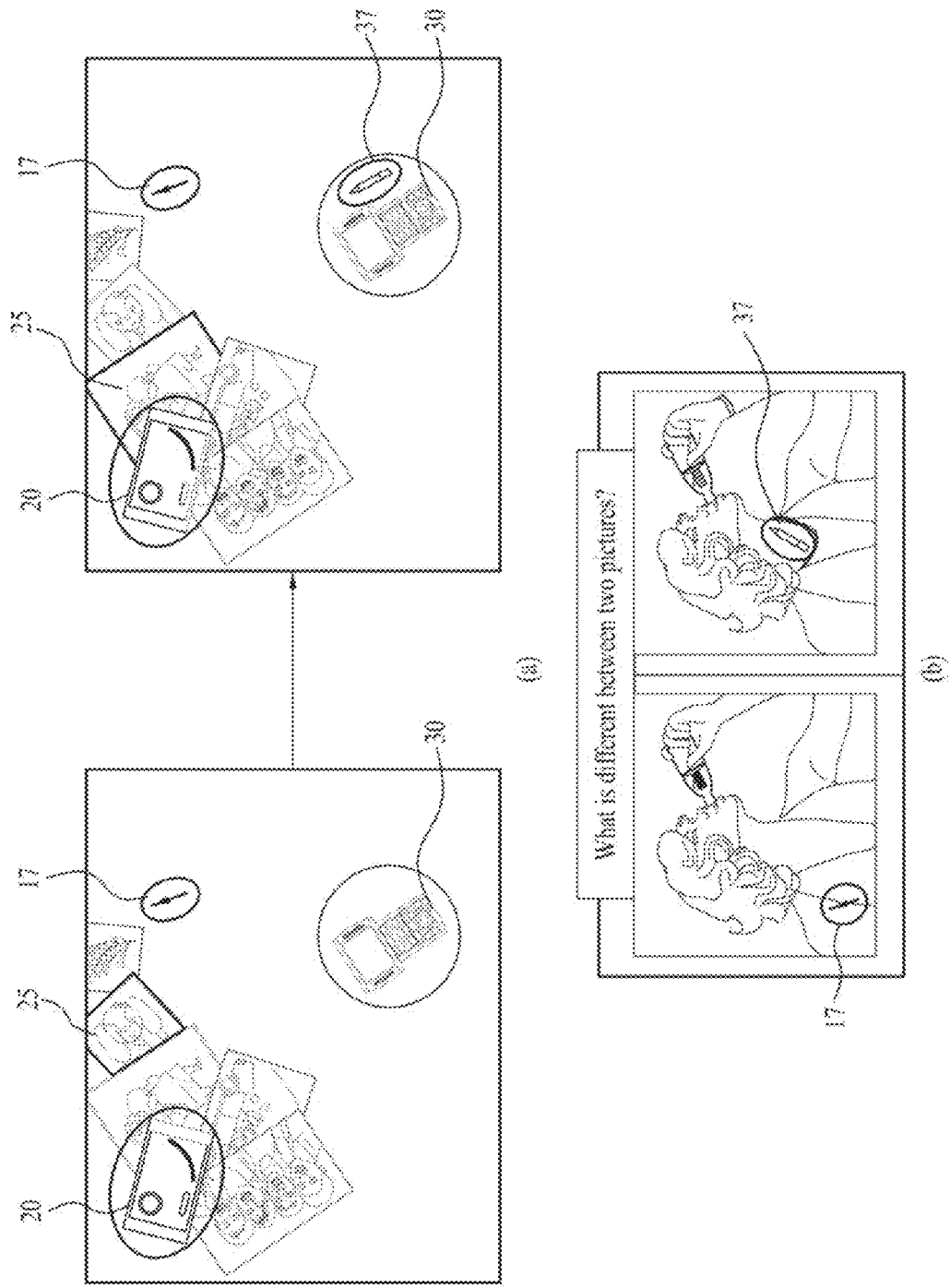
FIG. 11 is a conceptual diagram illustrating a plurality of control authorities and corresponding cursors in a mobile terminal according to an embodiment of the present invention.

FIG. 11 is a conceptual diagram for a plurality of control authorities and corresponding cursors in a mobile terminal according to one embodiment of the present invention. Besides, all display diagrams including FIG. 11 in the following illustrate states where cursors are displayed on at least one of a first display and a second display.

Referring to (a) of FIG. 11, a first cursor 17 responding to an input via the user input unit 130 of the terminal 100 is displayed as an arrow type. In this case, a second cursor responding to an input via an external device corresponding to an icon 30 displayed at a right bottom can be displayed as a pen type 37 to be discriminated from the first cursor 17. Therefore, as mentioned in the foregoing description, since the respective cursors are configured to independently manipulate the same display, users can enjoy games such as the illustrated 'different picture on real picture' shown in (b) of FIG. 11.

In the above description, the cursor functions and the method of displaying the cursors with respect to exemplary embodiments are explained. Examples of a method of controlling the cursors are explained in the following description according to an illustrative embodiment.

Figure 12:
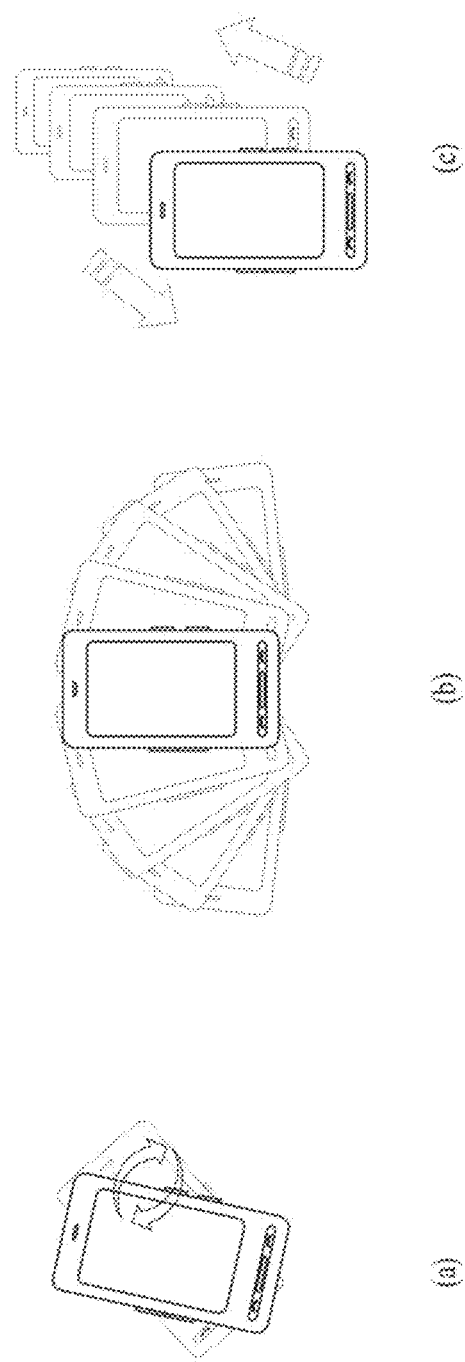
FIG. 12 is an exemplary diagram of an input through a device having a sensing unit.

If a touchscreen is provided to a device having acquired a control authority, the cursor may be shifted to another position on a second display corresponding to a point on the touchscreen (i.e., first display) that is contact-touched or proximity-touched by a pointer. And, the cursor may be shifted by dragging or proximity-dragging the pointer. If a keypad is provided, a second display may be divided into a plurality of areas. And, each of a plurality of the areas can be mapped to a key at a corresponding position on the keypad. Moreover, a cursor may also be manipulated by enabling specific keys of the keypad to work as navigation keys by assigning the specific keys to up, down, right and left directions, respectively. If an external device obtaining the cursor includes a sensing module for detecting an inclination or motion, the cursor may be controlled by detecting a shaking strength as shown in (a) of FIG. 12, an inclination angle as shown in (b) of FIG. 12 or a pattern of motion as shown in (c) of FIG. 12.

When the first cursor by the terminal 100 exists only, if the first cursor enters a prescribed area indicating an external device, the first cursor may be displayed by changing a type of the cursor to visually announce the cursor's entrance to the prescribed area. This is explained with reference to the display configuration diagrams shown in FIG. 13.

Figure 13:
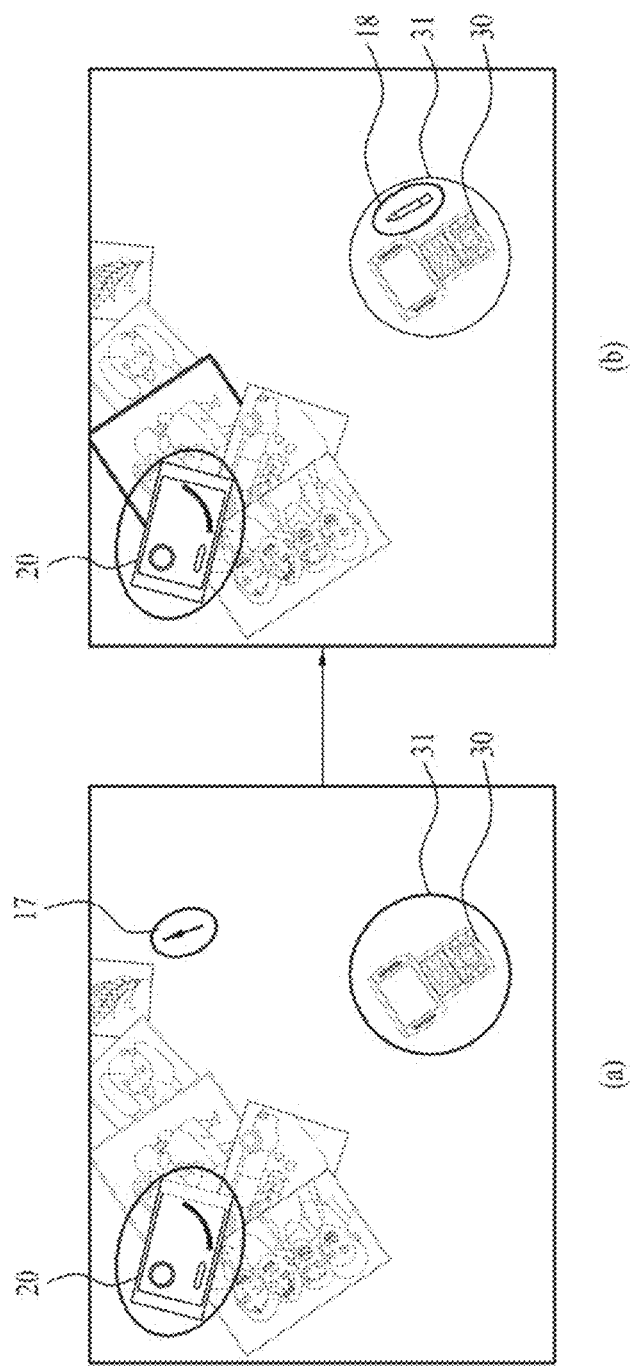
FIG. 13 is a diagram for a cursor type change in a specific area.

Referring to (a) of FIG. 13, a first cursor 17 responding to an input via the user input unit 130 of the terminal 100 is displayed. If the first cursor 17 enters a prescribed area 31 for displaying an icon 30 of a connected external terminal, as shown in (b) of FIG. 13, the first cursor 17 can be changed into a another cursor of another type 18 corresponding to the external terminal in order to announce that the first cursor 17 has entered the prescribed area 31, while it stays in the area 31. In addition, the corresponding cursor 18 can be changed into a type of a second cursor that is displayed when the external terminal acquires a control authority.

Meanwhile, if an input is not provided via the user input unit 130 of the terminal 100 during a prescribed time, the first cursor may be configured to disappear from the display. If an input is not provided from a corresponding external device, during a prescribed time, the second cursor may be configured to disappear from the display.

In the following description, explained is a process for executing a function related to an external device if an icon indicating the external device is selected using the above-described control authority and a corresponding cursor.

Prescribed Related Function Executed in Case of Selecting Prescribed Icon.

Examples for executing a function related to a connected external device in a terminal according to the various illustrative embodiments are explained with reference to FIGS. 14 to 20 as follows.

In an embodiment, when a connected external device is displayed as a prescribed icon on at least one of a first display and a second display, if the prescribed icon is selected by a device having a control authority to execute a prescribed related function, the icon's type may be changed to announce the selection prior to executing the related function. This is explained with reference to FIGS. 14A to 14D as follows.

FIGS. 14A to 14D are diagrams illustrating exemplary type changes of an icon indicating a selection of an external device in a mobile terminal according to an embodiment of the present invention.

Figure 14C:
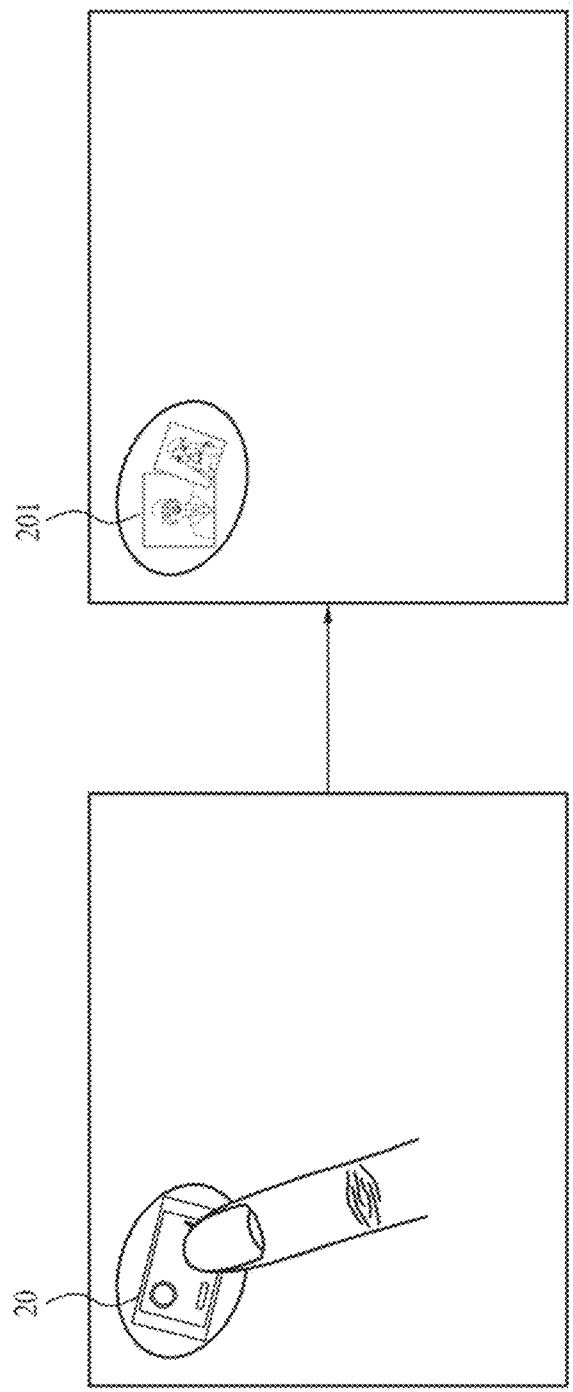

Referring to FIGS. 14A to 14D, an icon 20 of a connected external device is selected, a water pattern 91 or other indicator may appear around the icon 20, as shown in FIG. 14A.

As shown in FIG. 14B, in response to a user selection of icon 20, a background image 200 of the connected external device may be displayed within a prescribed icon display area 21.

Figure 14D:
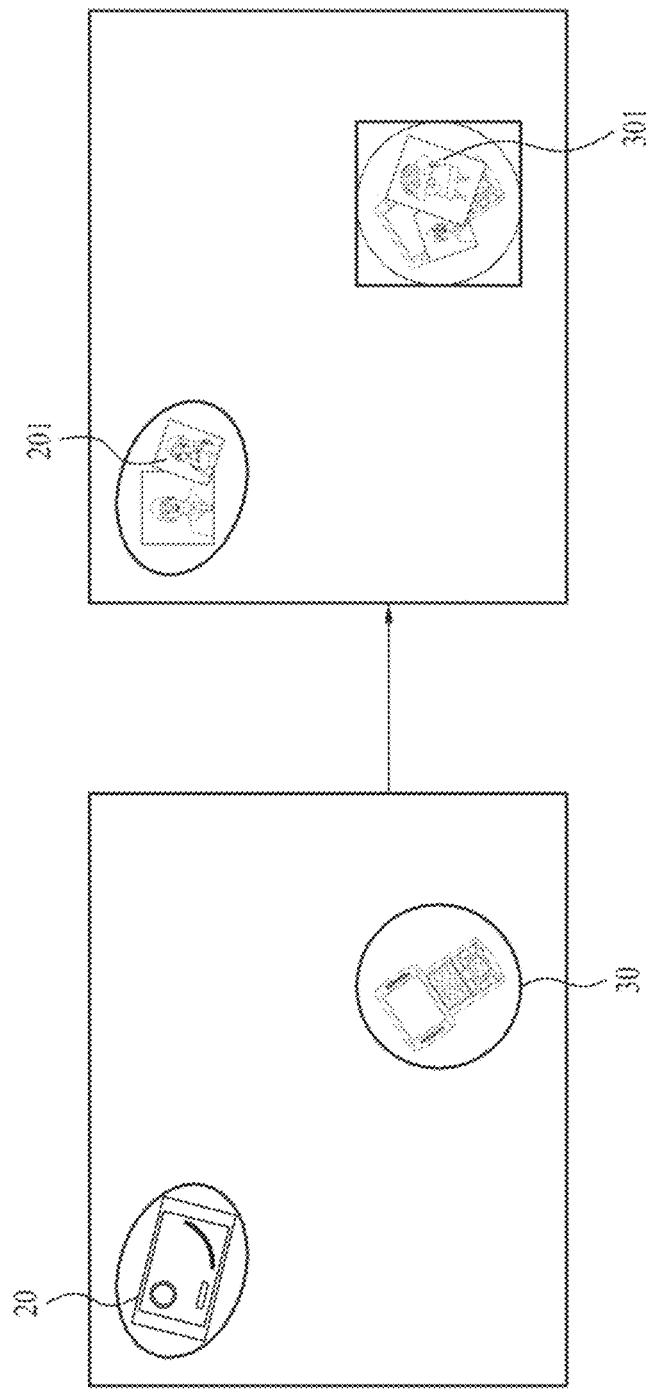

In FIG. 14C, in response to the user selection, files stored in the connected external device may be displayed as thumbnails 201. If a plurality of external devices are connected, as shown in FIG. 14D, the above effect (thumbnail display) (201, 301) can be given to the displayed areas.

In the following description, a function executable in association with an external device corresponding to a selected icon is explained.

As a first example, if a control authority is granted to the terminal 100 or to an external device by the above-described methods and an input is received via a user input unit of the corresponding device, a function of displaying contents stored in the selected external device may be executed for at least one of a first display and a second display by sorting the contents in a prescribed arrangement form. The prescribed arrangement can have one of various forms including a random spreading of preview-applied objects, a file list of a text type, a neat arrangement of icon types, etc. This is explained with reference to display diagrams shown in FIGS. 15A and 15B.

Figure 15A:
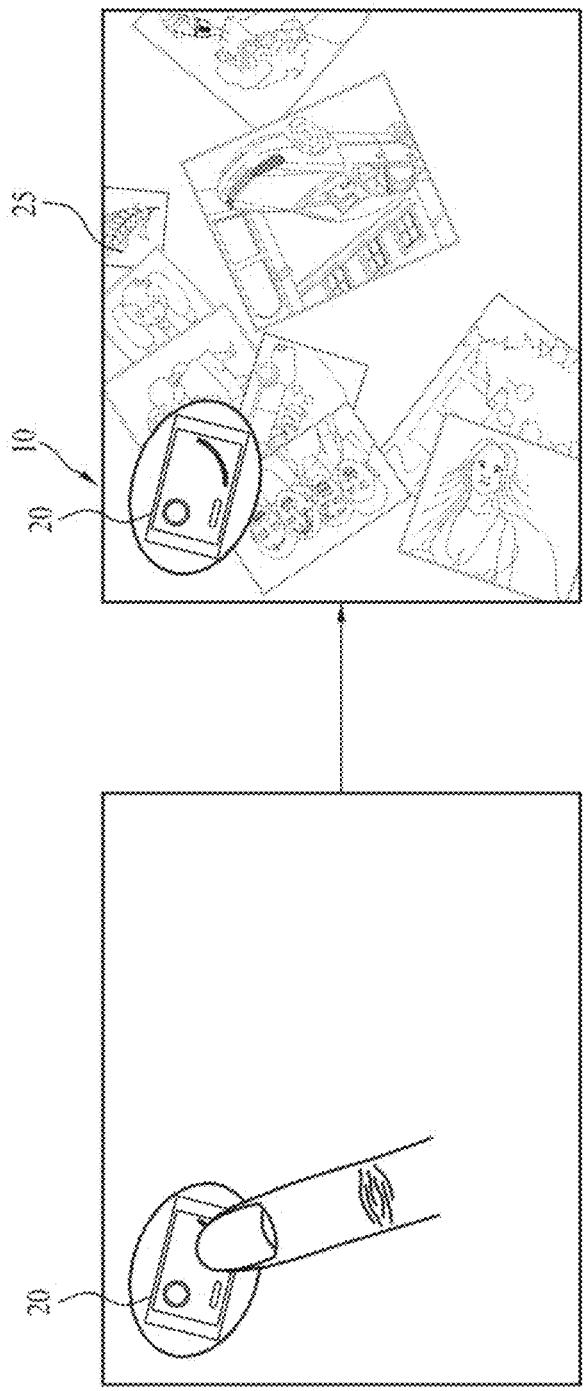

FIGS. 15A and 15B are diagrams for a method of displaying an object of a photo album.

Referring to FIGS. 15A and 15B, if an icon 20 indicating a connected external device is selected, as shown in FIG. 15A, photos 25 stored in the external device are displayed as preview or thumbnail type objects in a randomly-spread arrangement. The photos 25 can be displayed at one time. Alternatively, the photos can be displayed in a manner of sequentially exhibiting a portion 25a of the photos according to a data reception sequence or setup, and then exhibiting the whole of the photos 25, as shown in FIG. 15B.

As a second example, a function may be executed for reordering the displayed contents in another form and then displaying the reordered contents. Another function may be executed for transferring the displayed contents to another connected external device. These functions are explained with reference to the display diagrams shown in FIGS. 16A to 16C as follows.

Figure 16A:
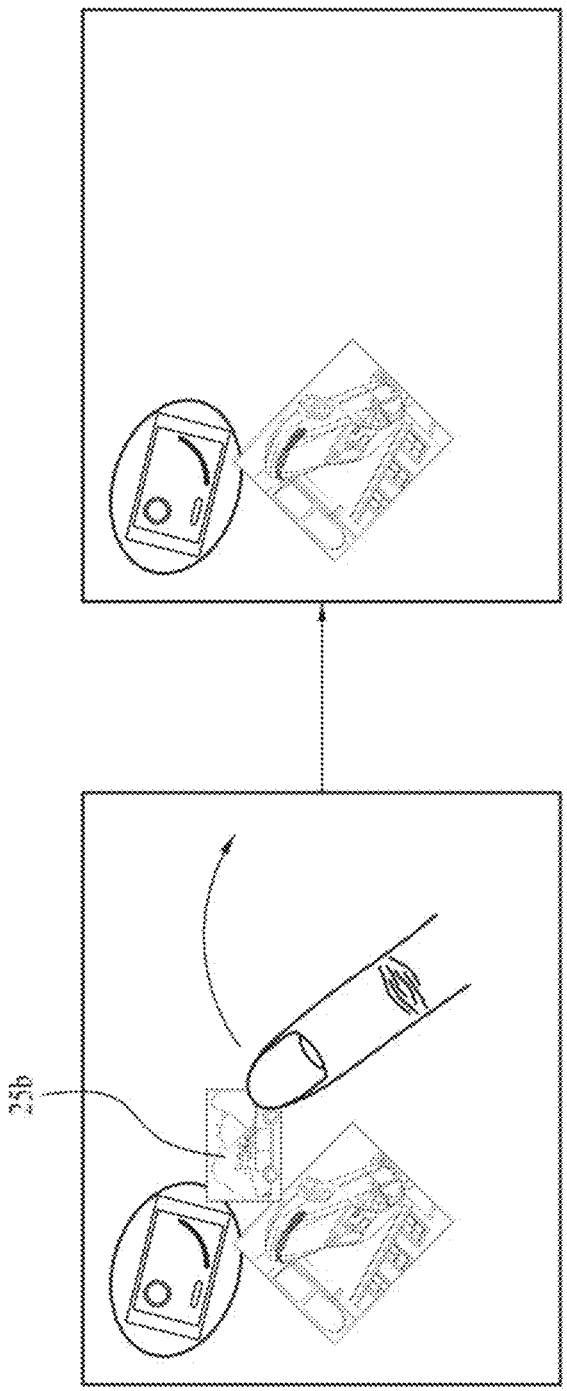
Figure 16B:
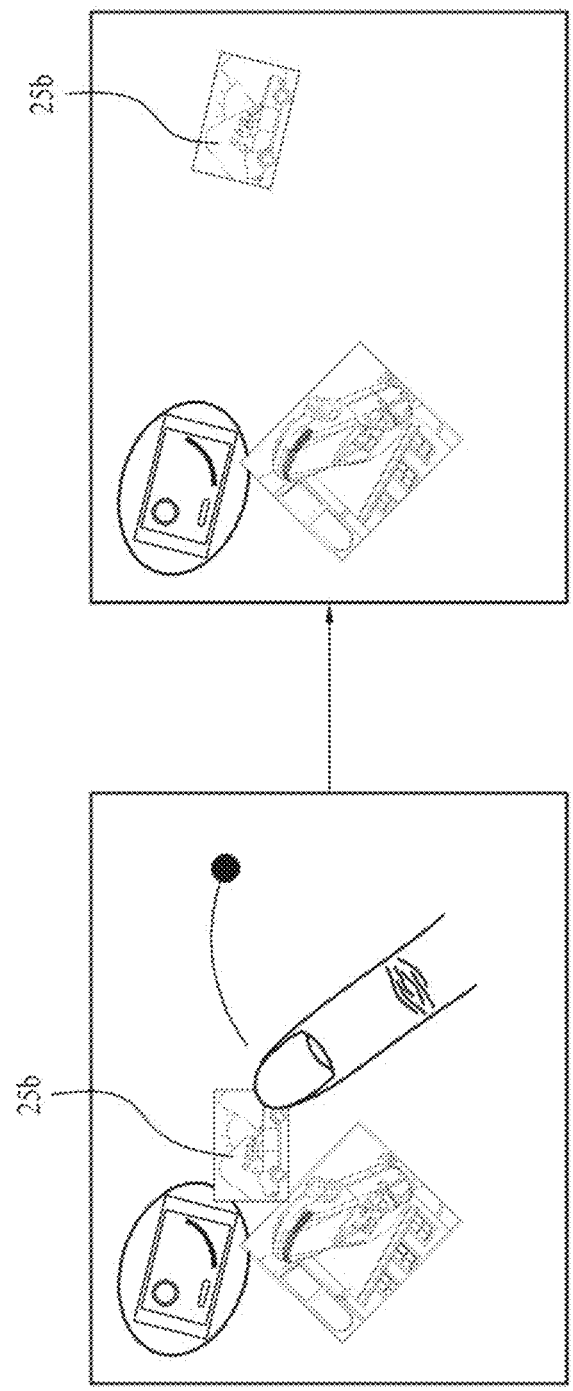

FIGS. 16A to 16C are diagrams for controlling a displayed object. Referring to FIGS. 16A to 16C, after one object 25b has been selected as shown in FIG. 16A, if the selected object 25b is flicked, the object 25b can be configured to disappear from a display. After an object 25b has been selected as shown in FIG. 16B, the object 25b can be repositioned on a display by a drag & drop operation. Moreover, referring to FIG. 16C, the object can be transferred or copied from one external device icon 20 to another external device icon 30 by a drag & drop operation.

The above-described prescribed functions can be implemented in various ways on a display. This is explained in detail with reference to the display diagrams shown in FIGS. 17A to 17C as follows.

Figure 17B:
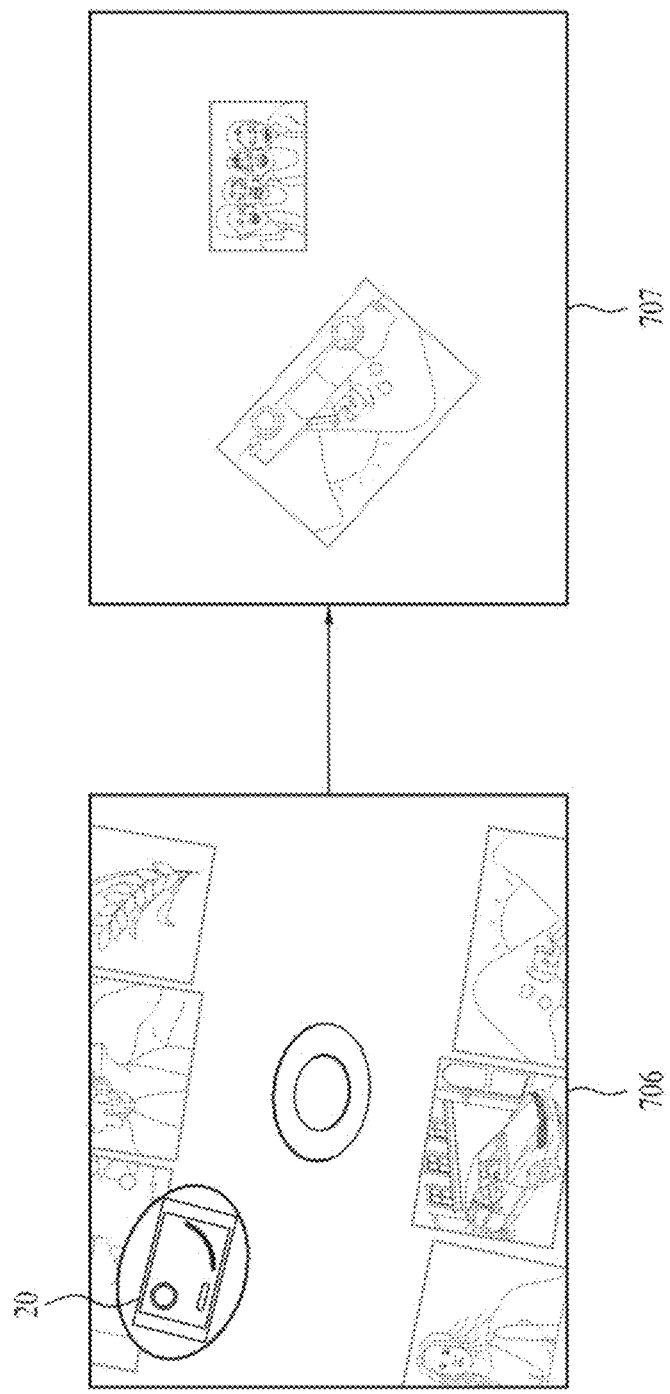
Figure 17C:
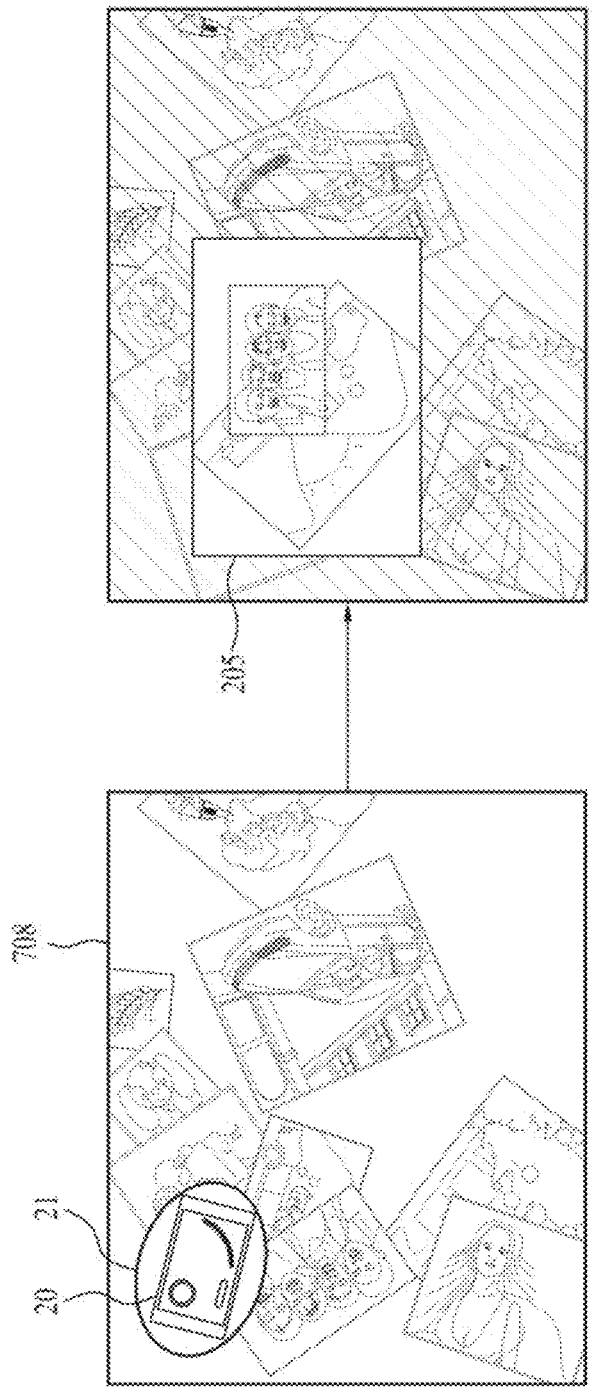

FIGS. 17A to 17C are diagrams showing examples of various ways in which functions related to a selected external device can be implemented in accordance with illustrative embodiments.

For instance, an icon 20 of an external device for performing a related function, as shown in FIG. 17A, is enlarged and displayed together with a prescribed area 21. Alternatively, a previous image 706 displayed on a display can entirely disappear and objects of the related function can be displayed as a whole image (clean view) 707, as shown in FIG. 17B. Moreover, a type of OSD (on screen display) may be configured for displaying an image 205 of the related function on a previously-displayed image 708, as shown in FIG. 17C.

As a further illustration, the related function can include an execution of such a multimedia function as enlarge, reduce, rotation, play, full-screen view, release full-screen view, volume adjust and the like according to a format of contents stored in the connected external device. In particular, if the format of the stored contents is an image, the function of enlarge, reduce, rotation, play, full-screen view, release full-screen view or the like is executable. If the format of the stored contents is a moving picture, a function of play, stop, fast search or the like is further executable. If the format of the stored contents is a format including sound, a function of play, stop, volume adjust or the like is executable.

A multimedia function corresponding to the selected icon/external device can be instantly executed by displaying a control menu on the arranged object or icon or by activating a prescribed player on a display separately. By the above method, an image or a moving picture file may be reproduced or manipulated accordingly. The functions of full-screen display, full-screen release and the like may also be executed according to a user manipulation.

For instance, assuming that the terminal 100 or an external device having acquired a control authority is provided with a user input unit, if two points on an object (e.g., left bottom and right top) are multi-touched and then dragged in an inner/outer diagonal direction to reduce or enlarge the object, a size of the object can be reduced/enlarged. In order to rotate an object, two points on an object (e.g., left bottom and right top) are multi-touched and then rotated in the same direction.

Moreover, if a plurality of content having the same format is displayed on one display, the above-described multimedia function can be executed as a function for providing a specialized multimedia function for a photo album, a moving picture album, a music album or the like. In other words, if a plurality of image content exists on one display, an image viewer is executable by providing a specialized environment (photo album). If a plurality of music content exists on one display instead of image content, a music player is executable by providing an environment (music album) specialized for music play. This is explained with reference to display diagrams shown in FIG. 18 as follows.

Figure 18:
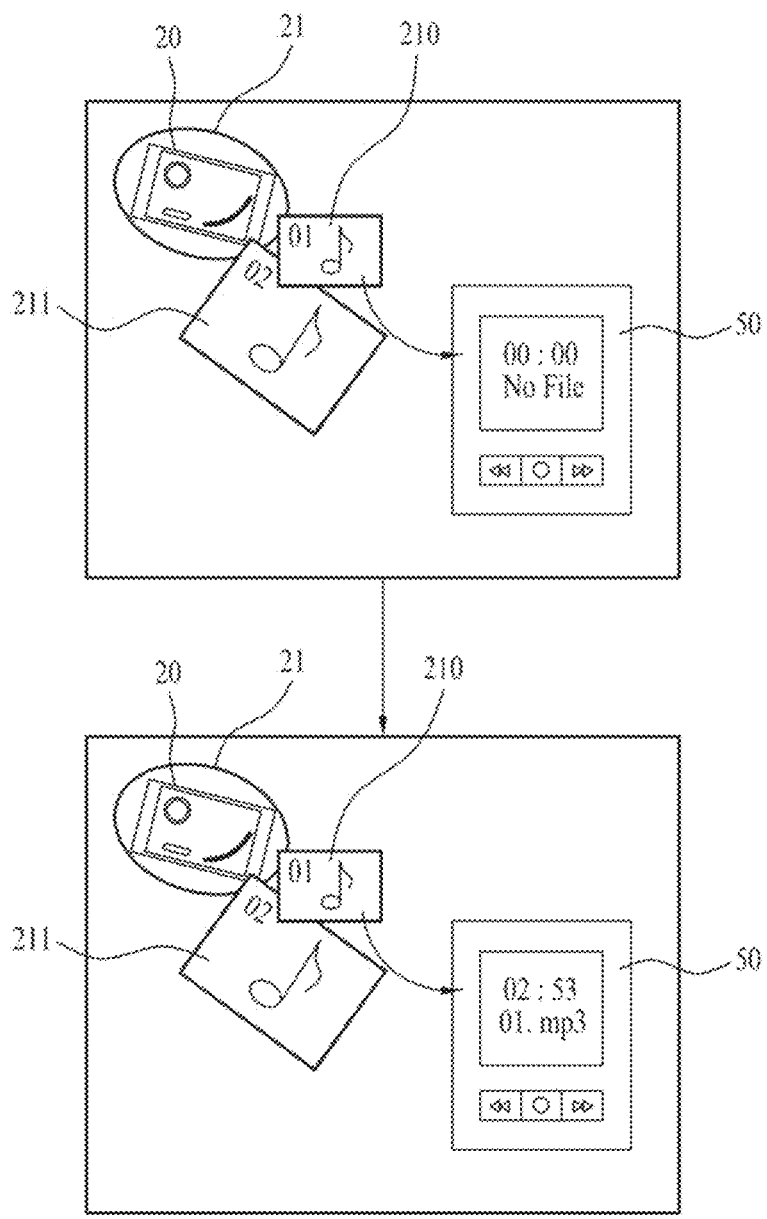
FIG. 18 is a diagram for executing a music album through a function related to a selected external device.

FIG. 18 is a diagram for executing a music album through a function related to a selected external device. Referring to FIG. 18, if a related function is executed as a type of a music album, music file objects 210 and 211 are arranged around an icon 20 of a connected external device. In this case, the music file can be played, stopped or volume-adjusted in a manner of activating a prescribed player 50, dragging one object 210 and then dropping the dragged object on the player 50 (drag & drop).

Meanwhile, the related function can include a map sharing function. This is explained with reference to FIG. 19.

Figure 19:
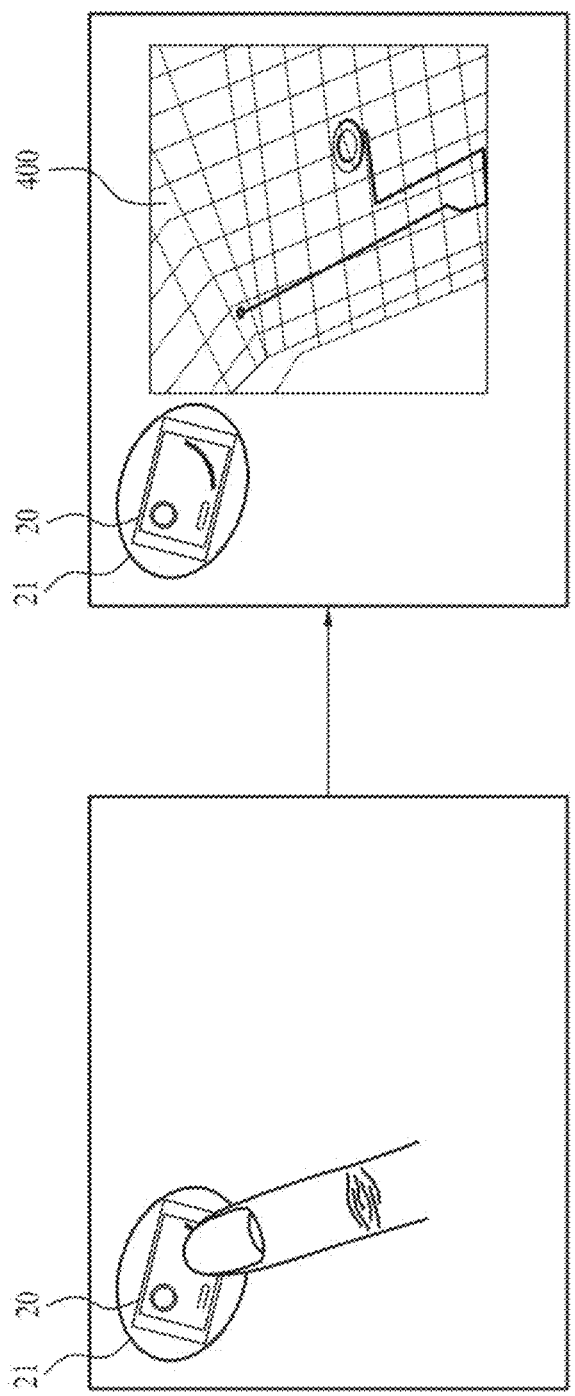
FIG. 19 is a diagram for executing sharing of map information through a function related to a selected external device.

FIG. 19 is a diagram for executing sharing of map information through a function related to a selected external device. Referring to FIG. 19, when an icon 20 of an external device is selected, map information stored in the selected external device is received and then displayed on at least one of a first display and a second display. By specifying a point on the displayed map image 400, a bookmark function, a function of searching a short-cut, a function of changing a scale of the map, a function of transmitting map information to another connected external device and the like may be executed.

In the course of executing the above-described related functions, in the case of attempting to end the execution of the corresponding function, in an embodiment, an icon of the function-executed external device may be selected again or a communication for executing the related function may be disconnected. This is explained with reference to FIG. 20 as follows.

Figure 20:
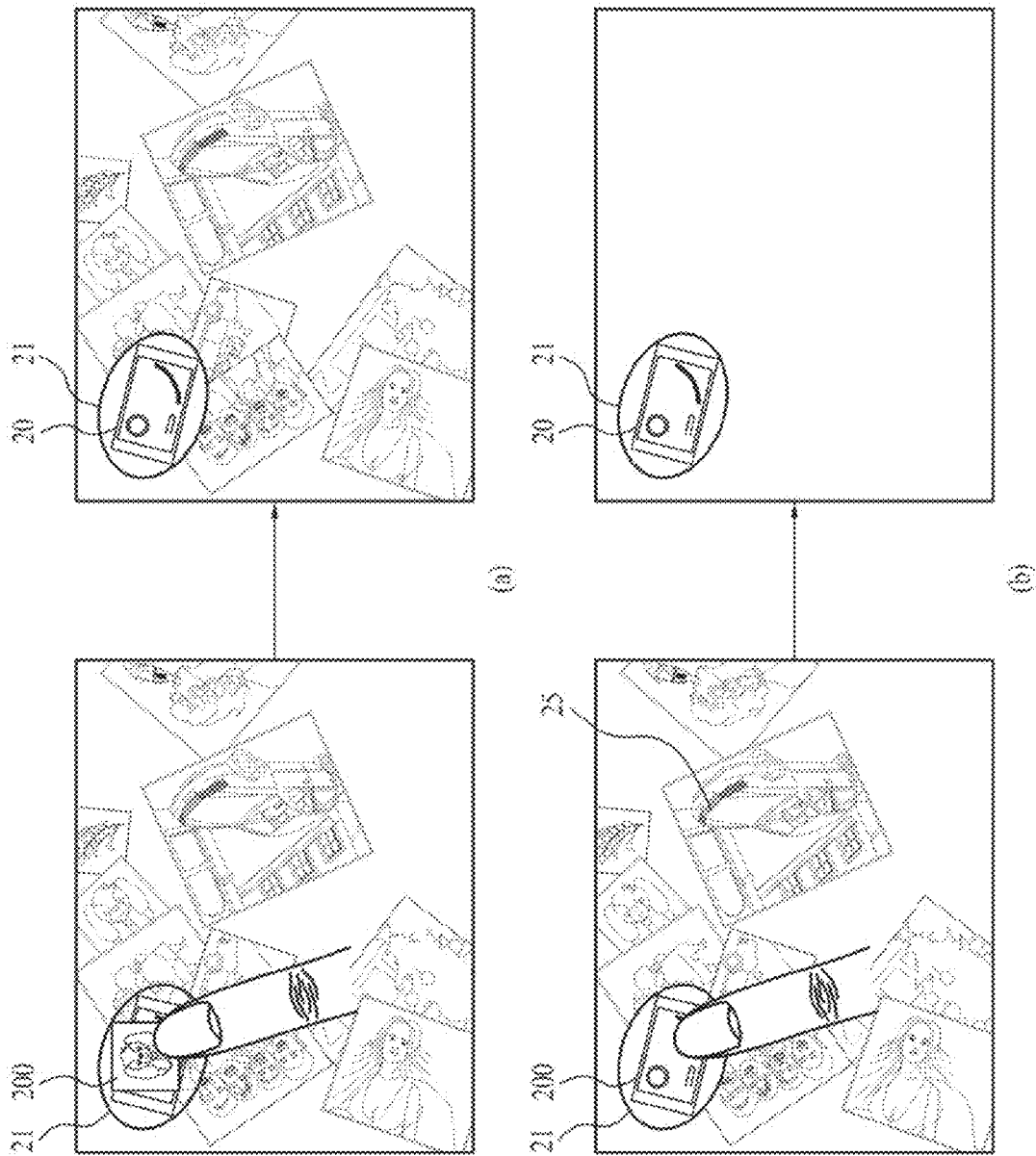
FIG. 20 is a diagram for ending a function related to a selected external device.

FIG. 20 is a diagram for ending a function related to a selected external device. Referring to (a) of FIG. 20, while a background image 200 of an external device is being executed as a function related to the external device, if a corresponding icon 20 is selected, the background image 200 may be configured to disappear.

Referring to (b) of FIG. 20, a photo album is being executed as a function related to an external device by arranging photos 25. If an icon 20 of the corresponding external device is selected, the photo album function may be stopped as soon as the photos 25 disappear from a display.

Figure 21:
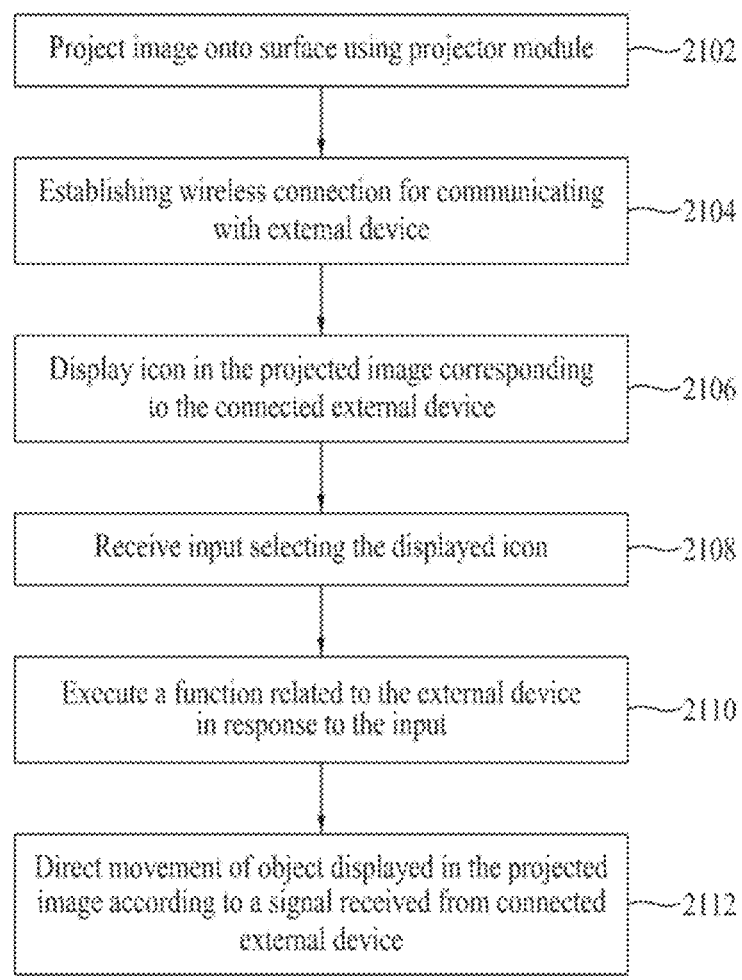
FIG. 21 is a flow chart illustrating an exemplary method for controlling a mobile terminal in accordance with an embodiment of the present invention.

FIG. 21 is a flow chart illustrating an exemplary method for controlling a mobile terminal in accordance with an embodiment of the present invention. An image is projected onto an external surface using the projector module (2102). Via the wireless communication unit 110 (FIG. 1), a wireless connection is established between the mobile terminal and one or more external devices for communication (2104). It should be noted that the order of steps 2102 and 2104 may be reversed. In addition, in other embodiments, step 2102 may not occur until some time later in the procedure. In the embodiment of FIG. 21, an icon is thereupon displayed in the projected image corresponding to the connected external device (2106). The icon may in fact constitute more than one icon, and may constitute any of image, text, animation, or another tangible representation.

Thereupon, an input is received selecting the displayed icon (2108). The input may, for example, be a user input received at a user input unit 130 (FIG. 1) or sensing unit 140 of the mobile terminal. The input may also be a user input received at the connected external device using a keypad, touchscreen, mouse, trackball, motion (when the external device is equipped with a motion sensor), or other input means. The input may constitute more than one physical input or signal, or may involve the selection of more than one icon.

In response to the input selecting the icon(s), the controller executes a function related to the external device (2110) as described above. In addition, the controller may direct a movement of an object displayed in the projected image according to a signal received from the connected external device. The object may, for example, be a cursor, a representation of an action figure or other component of a game, a chess piece, or the like. In one embodiment, the object may be a cursor used to select the icon to execute the function after the connection with the external device is established.

Accordingly, the present invention provides, among others, the following effects and/or advantages.

First of all, according to one or more embodiments of the present invention, data stored in an external device can be conveniently shared through a large-size screen using a projection plane projected by a projector.

Secondly, according to at least one of embodiments of the present invention, a terminal using a projector may be conveniently controlled via a connected external device without moving the terminal.

Thirdly, according to at least one or more embodiments of the present invention, since simultaneous controls are possible by a plurality of control authorities, a plurality of users can enjoy a game on one screen using a plurality of external devices.

It will be apparent to those skilled in the art that various modifications and variations can be specified into other forms without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a projector module configured to project an image onto an external surface;
an input unit configured to receive user input;
a wireless communication unit configured to establish a wireless connection for communicating with an external device, wherein the wireless connection is established via a short-range communication module of the wireless communication unit; and
a controller configured to:
determine a direction in which the connected external device is positioned in relation to the mobile terminal based on location information received from the connected external device via the short-range communication module,
control displaying of an icon representing the connected external device in the projected image,
receive an input via the input unit for selecting the displayed icon,
execute a function related to the connected external device in response to the input, and
direct movement of an object displayed in the projected image according to a signal received from the connected external device,
wherein the icon displayed in the projected image indicates a type of the connected external device and a location of the icon within the projected image indicates the direction in which the connected external device is positioned in relation to the mobile terminal based on the determined direction.

2. The mobile terminal of claim 1, wherein the function comprises displaying contents of the connected external device in the projected image.

3. The mobile terminal of claim 1, wherein the object includes a cursor.

4. The mobile terminal of claim 1, wherein the controller is further configured to:
display a first cursor in the projected image, and
direct movement of the first cursor in response to an input received via the input unit.

5. The mobile terminal of claim 4, wherein the object includes a second cursor and the controller is further configured to direct movement of the second cursor in response to an input received at the connected external device.

6. The mobile terminal of claim 5, wherein the controller is further configured to direct movement of the second cursor in the projected image for a distance corresponding to information received at the connected external device.

7. The mobile terminal of claim 6, wherein the information is received by a pointer being dragged on a touch screen of the connected external device.

8. The mobile terminal of claim 5, wherein the controller is further configured to detect a correct position of the external device.

9. The mobile terminal of claim 1, wherein the input is received directly from the connected external device.

10. The mobile terminal of claim 2, wherein the controller is further configured to activate a multimedia function in response to displaying contents corresponding to a same multimedia type.

11. The mobile terminal of claim 10, wherein the multimedia function includes an audio player, a video player, an image viewer, or a photo album.

12. The mobile terminal of claim 1, wherein the controller is further configured to add a visual effect to the displayed icon, the visual effect signifying at least a use frequency of the connected external device, a connection sequence of the connected external device, a connection priority of the connected external device, or a physical location of the connected external device.

13. The mobile terminal of claim 5, wherein the controller is further configured to direct movement of the second cursor in the projected image in response to movement of the connected external device detected by a sensing unit of the connected external device.

14. The mobile terminal of claim 2, wherein the controller is further configured to change a type of the displayed icon in response to the displayed icon being selected.

15. The mobile terminal of claim 5, wherein the controller is further configured to display the first and second cursors to be visually distinguishable from each other.

16. The mobile terminal of claim 1, wherein the function comprises transmitting content to the mobile terminal or the connected external device.

17. The mobile terminal of claim 1, wherein the function comprises viewing interactive map information stored in the connected external device.

18. A method of controlling a mobile terminal configured with a projector module, the method comprising:
projecting an image from the projector module onto an external surface;
establishing, via a wireless communication unit of the mobile terminal, a wireless connection for communicating with an external device, wherein the wireless connection is established via a short-range communication module of the wireless communication unit;
determining, via a controller of the mobile terminal, a direction in which the connected external device is positioned in relation to the mobile terminal based on location information received from the connected external device via the short-range communication module;

displaying an icon representing the connected external device in the projected image;

receiving an input for selecting the displayed icon;

executing a function related to the external device in response to the input; and directing movement of an object displayed in the projected image according to a signal received from the connected external device, wherein the icon displayed in the projected image indicates a type of the connected external device and a location of the icon within the projected image indicates the direction in which the connected external device is positioned in relation to the mobile terminal based on the determined direction.

19. The method claim 18, wherein the function comprises displaying contents of the connected external device in the projected image.

20. The method claim 18, wherein the object includes a cursor.

21. The method claim 18, further comprising directing movement of a first cursor displayed in the projected image in response to input received at the mobile terminal.

22. The method claim 21, wherein the object includes a second cursor and directing the movement comprises directing movement of the second cursor in response to input received at the connected external device.

23. The method claim 22, further comprising directing movement of the second cursor in the projected image for a distance corresponding to information received at the connected external device.

24. The method claim 23, wherein the information is received by a pointer being dragged on a touch screen of the connected external device.

25. The method claim 18, further comprising detecting by the mobile terminal a location of the external device.

26. The method claim 18, wherein the input is received directly from the connected external device.

27. The mobile terminal of claim 1, wherein the object includes a music file object, an action figure representation of a game component.

28. The method claim 18, wherein the object includes a music file object, an action figure representation of a game component.

* * * * *